(12) United States Patent
Barlew et al.

(10) Patent No.: US 11,940,964 B2
(45) Date of Patent: Mar. 26, 2024

(54) SYSTEM FOR ANNOTATING INPUT DATA USING GRAPHS VIA A USER INTERFACE

(71) Applicant: Appen Limited, Chatswood (AU)

(72) Inventors: Jefferson Barlew, Westerville, OH (US); Christopher Riley, Fishers, IN (US)

(73) Assignee: Appen Limited (AU)

( * ) Notice: Subject to any disclaimer, the term of this patent is extended or adjusted under 35 U.S.C. 154(b) by 0 days.

(21) Appl. No.: 17/667,137

(22) Filed: Feb. 8, 2022

(65) Prior Publication Data

US 2023/0252006 A1 Aug. 10, 2023

(51) Int. Cl.
| | | |
|---|---|---|
| G06F 16/21 | (2019.01) | |
| G06F 3/0482 | (2013.01) | |
| G06F 16/26 | (2019.01) | |
| G06F 40/169 | (2020.01) | |
| G06T 11/20 | (2006.01) | |

(52) U.S. Cl.
CPC .......... *G06F 16/213* (2019.01); *G06F 3/0482* (2013.01); *G06F 16/26* (2019.01); *G06F 40/169* (2020.01); *G06T 11/206* (2013.01); *G06T 2200/24* (2013.01)

(58) Field of Classification Search
CPC ...... G06F 16/213; G06F 16/26; G06F 40/169; G06F 3/0482; G06T 11/206; G06T 2200/24
USPC ....................................................... 707/807
See application file for complete search history.

(56) References Cited

U.S. PATENT DOCUMENTS

| | | | |
|---|---|---|---|
| 8,674,993 | B1 | 3/2014 | Fleming |
| 11,520,830 | B2 * | 12/2022 | Soares ................ G06F 16/9024 |
| 11,636,949 | B2 | 4/2023 | Goldberg |
| 2010/0309206 | A1 | 12/2010 | Yin |
| 2017/0032259 | A1 * | 2/2017 | Goranson ............. G06F 16/957 |
| 2018/0276278 | A1 | 9/2018 | Cagan |
| 2019/0213284 | A1 | 7/2019 | Anand |
| 2020/0097504 | A1 * | 3/2020 | Sequeda ............... G06F 16/367 |
| 2020/0293712 | A1 | 9/2020 | Potts |
| 2022/0382984 | A1 * | 12/2022 | Gelli ....................... G06F 18/29 |
| 2023/0037379 | A1 * | 2/2023 | Riley .......................... B01J 3/00 |
| 2023/0130973 | A1 * | 4/2023 | Madan .................. G06F 16/211 |
| | | | 707/807 |

OTHER PUBLICATIONS

Graphifi. EasyGraph: Knowledge Graph Platform. Dec. 7, 2020: https://web.archive.org/web/20201207132649/https://www.graphifi.com/easygraph.

(Continued)

*Primary Examiner* — Joshua Bullock

(74) *Attorney, Agent, or Firm* — Van Pelt, Yi & James LLP

(57) ABSTRACT

Annotating input data using graphs via a user interface is disclosed, including: receiving a selection of an imported ontological subgraph to import into an annotation of input data presenting at least a portion of the imported ontological subgraph in a user interface associated with editing the annotation of the input data; receiving, via the user interface, a user input to associate a selected portion associated with the input data with a previously defined node associated with the presented at least portion of the imported ontological subgraph; and updating the annotation of the input data based at least in part on the user input and the imported ontological subgraph.

20 Claims, 18 Drawing Sheets

(56) References Cited

OTHER PUBLICATIONS

Managing Content—Graphileon Documentation. For Dashboard Users Managing Content. May 4, 2021: https://docs.graphileon.com/graphileon/For_Dashboard_Users/Managing_Content.html.
NetworkView—Graphileon Documentation. For Dashboard Users > NetworkView. Dec. 14, 2020: https://docs.graphileon.com/graphileon/For_Dashboard_Users/NetworkView.html.
Paul Appleby. A first taxonomy in Graphologi. Aug. 25, 2020: https://web.archive.org/web/20201126141115/https://www.graphifi.com/a-first-taxonomy-in-graphologi.
Paul Appleby. Graphologi 1.0.7 release. Feb. 7, 2021: https://web.archive.org/web/20210208141549/https://www.graphifi.com/graphologi-1-0-7-release.
Paul Appleby. Graphologi visualisation. Feb. 22, 2021: https://web.archive.org/web/20210222220501/https://www.graphifi.com/graphologi-visualisation.
PoolParty GraphEditor—PoolParty Semantic Suite. Dec. 16, 2021: https://web.archive.org/web/20211216021912/https://www.poolparty.biz/poolparty-grapheditor.
PoolParty Thesaurus Manager—Premium Taxonomy Management Tool. Dec. 16, 2021: https://web.archive.org/web/20211216022005/https://www.poolparty.biz/poolparty-thesaurus-manager.
Sebastian Schmidt. Visual Ontology Modeling for Domain Experts andBusiness Users with metaphactory. Feb. 17, 2021.
TigerGraph Docs. Design Schema. GraphStudio and Admin Portal. Jan. 21, 2022: https://web.archive.org/web/20220121152945/https://docs.tigergraph.com/gui/current/graphstudio/design-schema.
Bess Schrader, "What's the Difference Between an Ontology and a Knowledge Graph?", 2020, Enterprise Knowledge White Paper, retrieved from "https://enterprise-knowledge.com/whats-the-difference-between-an-ontology-and-a-knowledge-graph/" (Year: 2020).
Gonzalez et al., "An Approach based on the ifcOWL Ontology to Support Indoor Navigation", 2021, Egyptian Informatics Journal 22(2021 )1-13 (Year: 2021).
Noy et al., "The PROMPT suite: interactive tools for ontology merging and mapping", 2003, Int. J. Human-Computer Studies 59(2003)983-1024 (Year: 2003).
Wu et al., "Ontology-based Subgraph Querying", 2013, 2013 IEEE 29th International Conference on Data Engineering (ICDE), DOI: 10.1109/ICDE.2013.6544867 (Year: 2013).

* cited by examiner

SYSTEM FOR ANNOTATING INPUT DATA USING GRAPHS VIA A USER INTERFACE

BACKGROUND OF THE INVENTION

While there are tools to visualize graph data, typically, editor tools for creating graphs are text-based and difficult to use. Furthermore, conventional editor tools either do not offer mechanisms for creating groups of subgraphs that are related or store the subgraphs as separate files and also treat the related subgraphs as different graphs. As a result, to associate multiple related subgraphs together, conventionally, the subgraphs are manually named using a designated file naming convention in a manner that associates together related subgraphs.

BRIEF DESCRIPTION OF THE DRAWINGS

Various embodiments of the invention are disclosed in the following detailed description and the accompanying drawings.

DETAILED DESCRIPTION

Figure 1:
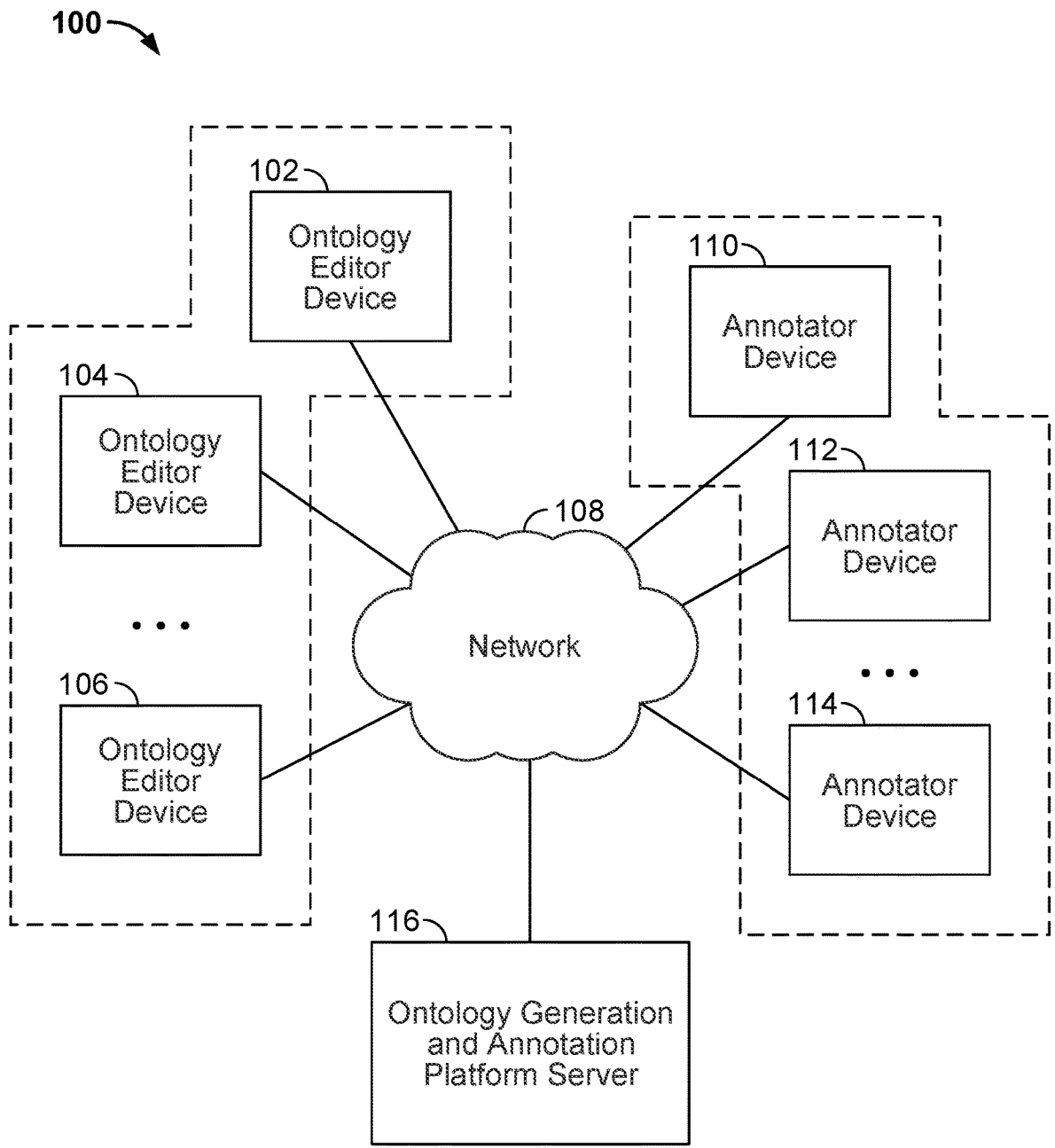
FIG. 1 is a system for generating ontologies and annotations using graphs.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of a system for ontological graph creation via a user interface are described herein. In various embodiments, an "ontological subgraph" or "ontological graph" is a set of nodes connected by edges that represent real-world resources and relationships. For example, a "node" may represent a resource or an entity and an "edge" represents a relationship between two nodes. For example, an ontological graph may represent a general data model that describes resources in a domain and the properties of such resources. In contrast to a knowledge graph which includes structures associated with (e.g., real-world) specific instances of resources/data that map to a particular ontology along with the ontology, the ontological subgraph or graph represents a general, reusable framework (ontology) that describes resources and their properties in graph form: in lay terms, a graph representation of the kinds of things there are and the way they are connected to each other. In various embodiments, "schema" is sometimes used to refer to an ontological subgraph with particular ontological or computational significance. In defining a current ontological graph using the user interface, a user may "import" a previously defined subgraph and cause at least a portion of the subgraph (e.g., a schema) to be populated into the visual input area of the user interface at which the current ontological graph is being defined. At least a portion of the imported ontological subgraph is presented in a user interface associated with editing the current ontological graph. In various embodiments, the imported subgraph may have been ingested from a source or previously defined by a user. The user interface provides a visual interface through which a graph creator user can add nodes and edges to create and edit a graphical representation of an ontological graph. A user input to associate a newly defined node associated with the current ontological graph with a previously defined node or edge associated with the presented at least portion of the current ontological graph is received via the user interface. For example, the user input can associate the newly defined node associated with the current ontological graph with a previously defined node associated with the presented at least portion of the current ontological graph by merging the two nodes together or by drawing a new edge between the nodes in the user interface. A graph database associated with the current ontological graph is updated based at least in part on the user input and the imported ontological subgraph. The current ontological graph that is created and edited in the user interface is programmatically translated into a corresponding graph database or a portion thereof that accounts for the one or more subgraphs that were imported into the current graph.

Embodiments of a system for annotating input data using ontological graphs are described herein. A selection of an imported ontological subgraph to import into an annotation of input data is received. In various embodiments, the input data comprises unstructured data that is provided by an annotation job management user. In various embodiments, the imported subgraph may have been predefined or previously defined by a user. For example, the input data may comprise audio, video, text and/or images. In various embodiments, annotations of the input data are collected and to be used as training data into a new or existing machine learning model to teach the model to better programmatically annotate subsequent input data. At least a portion of the imported ontological subgraph is presented in a user interface associated with editing the annotation of the input data. The user interface provides a visual interface through which an annotator user can add nodes and edges to create and edit a graph to serve as an annotation to a given input data. A user input to associate a selected portion associated with the input data with a previously defined node associated with the presented at least portion of the imported ontological subgraph. The annotation of the input data is updated to include the association between the selected portion associated with the input data and the previously defined node associated with the presented at least portion of the imported ontological subgraph.

FIG. 1 is a system for generating ontologies and annotations using graphs. As shown in the example, system 100 includes ontology editor devices 102 through 106, annotator devices 110 through 114, network 108, and ontology generation and annotation platform server 116. Ontology editor devices 102 through 106, annotator devices 110 through 114, and ontology generation and annotation platform server 116 may communicate to each other over network 108. In some embodiments, more or fewer ontology editor devices may communicate with ontology generation and annotation platform server 116 other than what is shown in FIG. 1. In some embodiments, more or fewer annotator devices may communicate with ontology generation and annotation platform server 116 other than what is shown in FIG. 1. Each of ontology editor devices 102 through 106 and annotator devices 110 through 114 may be a desktop computer, a tablet device, a smart phone, cloud-based server, or any networked device.

Ontology generation and annotation platform server 116 is configured to provide an ontology editor user interface at an ontology editor device (e.g., such as one or more of ontology editor devices 102 through 106) to facilitate an ontology editor user to generate an ontology comprising a graph. As mentioned above, an ontology is a generalized data model that defines types of resources and the properties of such resources. An "ontological graph" comprises a graph comprising nodes and edges that represents such a generalized data model. In contrast to a "knowledge graph," which comprises mappings of an ontology and of specific instances of (e.g., real-world) data to the ontology, an ontology does not include specific instances of data. For example, an ontology editor user comprises a member of an organization (e.g., an enterprise) that wants to create an ontology to model relationships among employees of the organization, including for example, relationships between a first type of employee that reports to a second type of employee, relationships between employees that are working together on the same project, and attributes (e.g., name, address, age) of employees of the organization.

In various embodiments, the ontology editor user interface provided by ontology generation and annotation platform server 116 comprises a visual interface through which an ontology editor user can select one or more types of nodes and also one or more types of edges to populate into and manipulate at a visual input area. For example, the ontology editor user can select two nodes (of the same or of different node types) at the ontology editor user interface to be added to the visual input area. The ontology editor user can edit each of the nodes by renaming a default name associated with the node, for example. The ontology editor user can further select a type of edge to connect the two nodes in the visual user input and, optionally, modify the edge (e.g., by changing the edge's name, the edge's direction, or other properties such as the logical properties of transitivity and reflexivity).

In various embodiments, the ontology editor user interface provided by ontology generation and annotation platform server 116 comprises a visual interface that further provides an interactive element for an ontology editor user to select to import a subgraph into a graph that is currently being generated or edited. In response to the selection of the interactive element for importing a subgraph into the current graph, information associated with one or more subgraphs ("schemas") that can be imported is presented. In various embodiments, the subgraph(s) that are presented as candidates for being imported into the current graph may have been predefined or have been previously defined and stored by a user. The ontology editor user can then select a subgraph to import into the current graph. In some embodiments, to avoid displaying the entire imported subgraph into the visual input area of the ontology editor user interface (e.g., so as to focus the presentation of the current graph on only elements (nodes and edges) that are candidates for additional editing), the ontology editor user can select a subset of the nodes and/or edges of the subgraph to import to be "inherited" by the current graph. By selecting a subset of the nodes and/or edges of the imported subgraph to be "inherited" by the current graph, in some embodiments, only those inherited nodes and/or edges are displayed within the visual input area of the ontology editor user interface with any existing node and/or edges associated with the current graph. In some embodiments, the nodes and/or edges of the imported subgraph that were not selected to be "inherited" by the current graph are hidden from the visual input area and/or presented but as a predetermined representation instead of as individual nodes and/or edges. The inherited elements of the imported subgraph are configured to be manipulable by the ontology editor user within the visual input area, for example, to be renamed, merged with other elements, and/or connected to other nodes via edges. In contrast, the nodes and/or edges of the imported subgraph that are not inherited by the current graph are configured to not be manipulable by the ontology editor user. To link/associate "inherited" elements of the imported subgraph with the current graph, in some embodiments, the ontology editor user can merge an inherited node from the imported subgraph with a node that was added to the visual input area associated with editing the current graph or generate a new edge between an inherited node and a node that was added to the visual input area associated with editing the current graph. In some embodiments, the ontology editor user can import zero or more subgraphs into a current graph and associate the imported subgraph(s) to the current graph in the visual input area of the ontology editor user interface as described above. Ontology generation and annotation platform server 116 is configured to translate the nodes and edges of the current graph, including the zero or more imported subgraphs, into a graph database (e.g., a single database file). In some embodiments, ontology generation and annotation platform server 116 is configured to store the current graph as a subgraph (which is sometimes referred to as "schema" herein) that is to be an option/candidate to be imported into another graph and/or as an ontology that is to be selected and used to provide an annotation graph for input data, as will be described further below.

Ontology generation and annotation platform server 116 is configured to provide a search query input user interface at an ontology editor device (e.g., such as one or more of ontology editor devices 102 through 106) to facilitate a searching user to generate a search query comprising an ontological graph. In some embodiments, the search query input user interface may include interactive elements (e.g., associated with adding/deleting nodes, adding/deleting edges, importing a subgraph) and a visual input area similar to the ontology editor user interface such that the searching user can generate an ontological graph (that includes zero or more imported subgraphs) in the visual input area to use as a search query against structured data. As mentioned above, an ontological graph describes a generalized data model of resource types and properties but does not include specific instances of resources. In various embodiments, "structured data" comprises specific instances of resources and with defined relationships. For example, structured data comprises knowledge base data (e.g., data stored in tables of relational databases). In another example, structured data comprises knowledge graph data (e.g., data that has been mapped to the nodes and edges of an ontological graph). In some embodiments, ontology generation and annotation platform server 116 is configured to search the search query comprising a user defined ontological graph against structured data (e.g., stored at ontology generation and annotation platform server 116 or at another location) to determine portions of the structured data that match the node and edge relationships that are defined in the search query. Put another way, ontology generation and annotation platform server 116 is configured to return and present at a search results user interface, a list of specific instances of the structured data that match the node and edge relationships that are described in the search query.

Ontology generation and annotation platform server 116 is configured to receive an annotation job comprising at least input data that is to be annotated using a subgraph associated with one or more selected ontologies. An annotation job may be submitted to ontology generation and annotation platform server 116 (e.g., via a client device) by an annotation job management user, for example, that is responsible for obtaining annotated training data (e.g., to aid in the creation of a new machine learning model or the updating of an existing machine learning model that is configured to programmatically annotate input data). For example, the annotation job management user may be a project manager, a data scientist, or a data engineer at an enterprise. To create the new annotation job, raw input data and at least one selected ontological graph associated with the annotation job are provided to ontology generation and annotation platform server 116. In some embodiments, the raw input data comprises unstructured data (e.g., data that is not organized in graphs or tables). In some embodiments, the raw input data may be text, images, audio, video, or other media. In some embodiments, the selected ontological graph was generated using the ontology editor user interface, as described above. In some embodiments, in the event that the raw input data is not already divided into discrete units of data, ontology generation and annotation platform server 116 is configured to divide the raw input data into discrete units of data. For example, if the input data included text, then the text can be programmatically divided into sentences. In another example, if the input data included images, then the images can be programmatically divided into individual images. For each unit of input data, ontology generation and annotation platform server 116 is configured to perform additional segmentation. For example, if the unit of input data included text, then the text can be programmatically segmented into discrete tokens (e.g., words and/or phrases). In another example, if the input data included images, then an image can be segmented/labeled with bounding boxes around portions of interest within that image (e.g., programmatically using machine learning or manually within the annotation job). In a specific example, if the annotator job creator user of the annotation job management device is a project manager/data scientist/engineer at an enterprise, the raw input data may be collected from the enterprise's customers. For example, search queries, emails, transcribed voice messages, and/or reviews that are submitted by an enterprise's customers may form the raw input data of an annotation job.

In response to receiving data associated with a new annotation job, ontology generation and annotation platform server 116 is configured to present unit(s) of input data in an annotation user interface at an annotator device (e.g., such as one or more of annotator devices 110 through 114) to enable an annotator user to define an annotation corresponding to the given units of input data and where the annotation comprises a graph associated with the selected ontological graph associated with the annotation job. In some embodiments, prior to presenting the given portion of the input data at an annotation user interface, ontology generation and annotation platform server 116 is configured to compare segments (e.g., text-based tokens, text-based labeled bounding boxes of images, or selected segments of audio or video recordings) to the names of nodes and/or edges within the selected ontology associated with the annotation job to determine potential matches. If ontology generation and annotation platform server 116 determines potentially matching nodes and/or edges from the selected ontology to a particular segment in the given unit(s) of the input data, then ontology generation and annotation platform server 116 can present the potentially matching nodes and/or edges from the selected ontology in association with the segment in the annotation user interface to assist the annotator user in selecting a relevant node/edge from the ontology to add to the visual input area of the annotation user interface. In some embodiments, similar to the ontology editor user interface and the search query user interface that are presented by ontology generation and annotation platform server 116, the annotation user interface may include interactive elements (e.g., associated with adding/deleting nodes, adding/deleting edges, importing a subgraph) and a visual input area such that the annotation user can generate an ontological or knowledge graph (that includes zero or more imported subgraphs) in the visual input area to use as an annotation of the unit(s) of input data that are presented at the annotation user interface. In some embodiments, the annotation user interface includes visual or other means for annotator users to link specific elements of the input data (e.g., individual tokens (words, phrases, etc.) or bounding boxes) to individual nodes and/or edges in the visual input area. The resulting combination of the unit(s) of input data and the annotation is structured data. In various embodiments, a graph that is user defined at the annotation user interface is referred to as an "annotation graph."

After ontology generation and annotation platform server 116 has collected annotations to the units of input data associated with an annotation job from multiple annotator devices, in some embodiments, ontology generation and annotation platform server 116 is configured to aggregate the collected annotations to generate an aggregate annotation report corresponding to the annotation job. In some embodiments, ontology generation and annotation platform server 116 is configured to obtain multiple sets of annotations (annotation graphs) submitted from different annotator devices corresponding to the same unit of input data and then determine an aggregated annotation result corresponding to that unit of input data by comparing the annotations to each other. For example, if more than a predetermined number of annotations that have been collected by ontology generation and annotation platform server 116 corresponding to the same unit of input data match each other, then ontology generation and annotation platform server 116 is configured to determine that an instance of the matching annotation is the aggregated annotation result for the unit of input data and will therefore include it in the aggregate annotation report. Otherwise, if fewer than a predetermined number of annotations that have been collected by ontology generation and annotation platform server 116 corresponding to the same unit of input data match each other, then ontology generation and annotation platform server 116 is configured to send that unit of input data to one or more annotator devices to obtain additional annotations on the unit of input data. Ontology generation and annotation platform server 116 is configured to send the aggregate annotation report corresponding to the annotation job to a client device from which the annotation job was received, for example. In some embodiments, the aggregate annotation report comprises a graphical representation. In some embodiments, the aggregate annotation report comprises a JSON or other structured data file. In some embodiments, the device that receives the aggregate annotation report is configured to input at least a portion of the report as training data into a new or existing machine learning model to train the model to better automatically annotate subsequent input data.

In some embodiments, ontology generation and annotation platform server 116 is configured to determine whether an ontological graph that is generated in the visual input area of a user interface is valid according to a given set of constraints. In some embodiments, the set of constraints is at least partially determined based on a standard (e.g., RDF). In some embodiments, the set of constraints is at least partially predetermined. In some embodiments, the set of constraints is at least partially determined by a user. In some embodiments, the set of constraints describes logical constraints on relationships (e.g., edges) that could or could not exist between given types of nodes. In the event that ontology generation and annotation platform server 116 determines that an ontological graph that is being generated in the visual input area is not valid, then ontology generation and annotation platform server 116 is configured to present a prompt at the user interface to cause the user to edit the graph (e.g., by adding or removing an edge or a node) so that it will become valid.

As described with system 100 of FIG. 1 and in further detail below, an ontological graph can be edited and generated in a visual input area embedded in a user interface. The visual input area assists a user in creating a graphical representation of an ontology and ensures that the resulting graph is valid. During editing of a given ontological graph, zero or more existing subgraphs can be imported into the given ontological graph. Furthermore, imported subgraphs are also stored with the given ontological graph in a single graph database. For example, a graph database can represent the elements (e.g., nodes and edges) and the relationships thereof of one or more ontological graphs and subgraphs. In the event that an ontological graph was defined (at an ontological editor user interface) to include one or more imported subgraphs from the graph database, then the representation of the ontological graph in the graph database can store references to those imported subgraphs. The same subgraph, which may have been created via the user interface, can be imported into different graphs, which increases the efficiency of ontological graph creation because portions thereof can be easily populated with existing subgraphs. The generated ontological graph can be applied towards various uses. In a first example use case, the generated ontological graph can be stored as an ontology or as a subgraph that is a candidate to be imported into another graph. In a second example use case, the generated ontological graph can be used to search through structured data (e.g., data in relational databases or knowledge graph data) to determine specific instances of data with relationships that match what is described in the search query comprising the ontological graph. In a third example use case, the generated ontological graph can be used as an annotation of input data associated with an annotation job. The generated ontological graphs can be translated into a graph database and also exported as a generic (e.g., text-based, JSON, or other) format that can be consumed by other graph visualizing tools.

Figure 2:
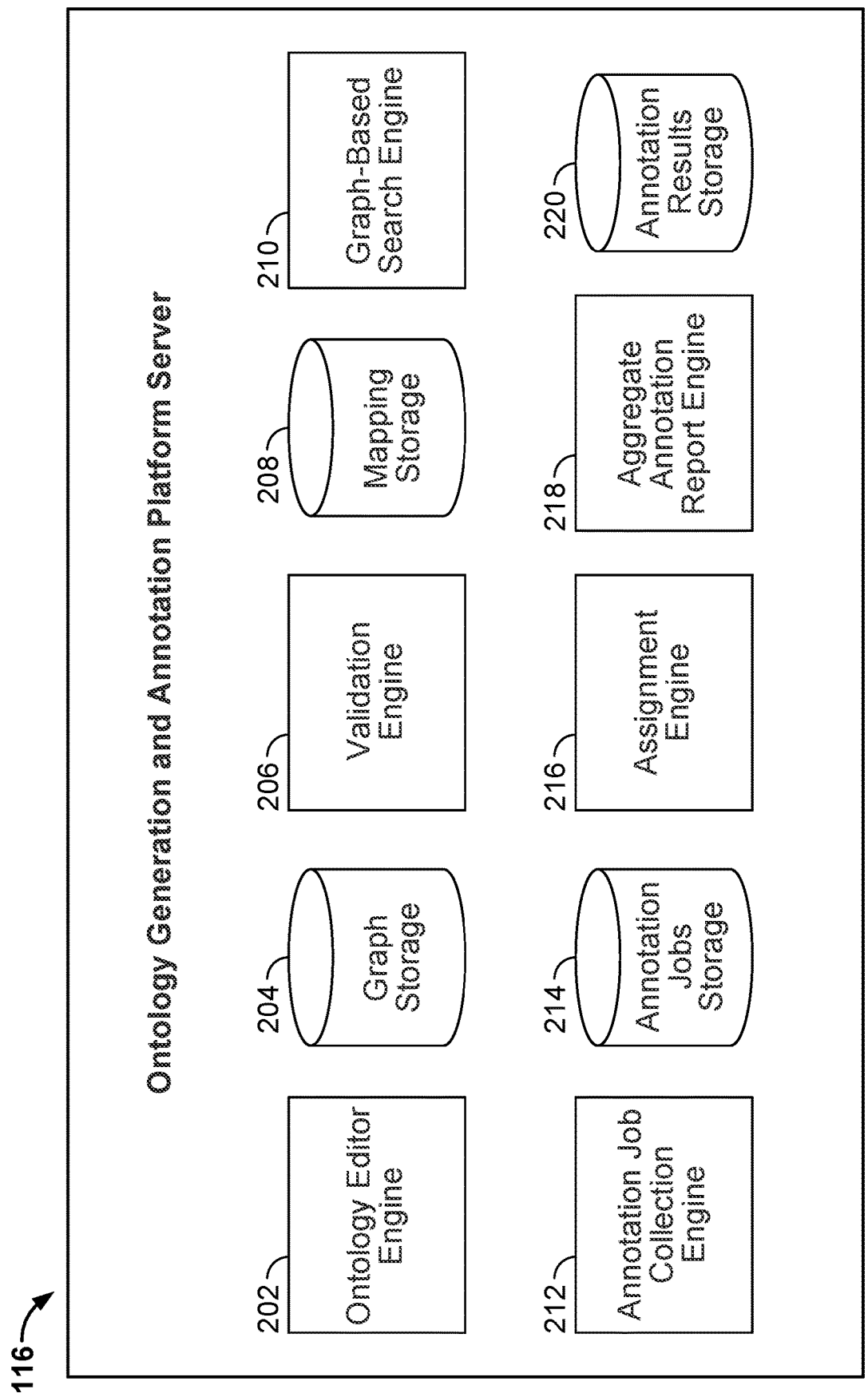
FIG. 2 is a diagram showing an example of an ontology generation and annotation platform server.

FIG. 2 is a diagram showing an example of an ontology generation and annotation platform server. In some embodiments, ontology generation and annotation platform server 116 of FIG. 1 may be implemented using the example ontology generation and annotation platform server of FIG. 2. In FIG. 2, the example of the ontology generation and annotation platform includes ontology editor engine 202, graph storage 204, validation engine 206, mapping storage 208, graph-based search engine 210, annotation job collection engine 212, annotation jobs storage 214, assignment engine 216, aggregate annotation report engine 218, and annotations results storage 220. Each of job ontology editor engine 202, validation engine 206, graph-based search engine 210, annotation job collection engine 212, assignment engine 216, and aggregate annotation report engine 218 may be implemented using one or both hardware and software. Each of graph storage 204, mapping storage 208, annotation jobs storage 214, and annotation results storage 220 may be implemented using one or more databases and/or any type of storage media. In some embodiments, one or more instances of ontology editor engine 202, validation engine 206, graph-based search engine 210, annotation job collection engine 212, assignment engine 216, and aggregate annotation report engine 218, graph storage 204, mapping storage 208, annotation jobs storage 214, and annotation results storage 220 may be implemented to service the requests of one or more ontology editor devices and/or annotator devices. In some embodiments, one or more of ontology editor engine 202, validation engine 206, graph-based search engine 210, annotation job collection engine 212, assignment engine 216, and aggregate annotation report engine 218, graph storage 204, mapping storage 208, annotation jobs storage 214, and annotation results storage 220 may be combined with each other. For example, annotation job collection engine 212 and assignment engine 216 may be implemented together as a single process or apparatus in one embodiment and separately as different processes or apparatuses in another embodiment.

Ontology editor engine 202 is configured to present an ontology editor user interface at an ontology editor device. For example, ontology editor engine 202 is configured to present the ontology editor user interface at a website. As mentioned above, the ontology editor user interface comprises a visual input area and a set of editing tools to enable an ontology editor user to add nodes and edges between nodes in the visual input area. In addition, the ontology editor user interface comprises an interactive element that in response to a user selection, presents information associated with subgraphs that can be imported into the visual input area. After a subgraph is selected to be imported into the visual input area, the ontology editor user can optionally select a portion of the subgraph to be inherited by the graph being edited in the visual input area. The selected portion of the imported subgraph is then presented within the visual input area as individual nodes and/or edges, while the unselected portion of the subgraph is either hidden (e.g., not presented) or presented as a predetermined image within the visual input area. Presenting only the selected portion of the imported subgraph as individual nodes and/or edges within the visual input area of the ontology editor user interface may streamline the presentation of nodes and edges that are being edited within the visual input area, especially when the graph being edited is complex and/or several subgraphs have been imported into the current graph. To associate the inherited nodes/edges of each imported subgraph with the graph that is currently being edited at the visual input area of the ontology editor user interface, the ontology editor user can add associations between the inherited nodes/edges of the imported subgraph with new or existing nodes/edges that have been input into the visual input area. A first example of such an association is to merge a node inherited from an imported subgraph with another node that had been populated into the visual input area. A second example of such an association is to draw a new edge between a node inherited from an imported subgraph with another node that had been populated into the visual input area. In some embodiments, ontology editor engine 202 is configured to translate the nodes, edges, and imported subgraph(s) of the ontological graph that have been input into the visual input area of the ontology editor user interface into a representation that is stored in a graph database. For example, an example graph database is JanusGraph. In some embodiments, ontological graphs created over an ontology editor user that is provided by ontology editor engine 202 are stored at graph storage 204.

Validation engine 206 is configured to compare an ontological graph to a set of validation constraints to determine whether the nodes and the edges between the nodes of the graph are valid. In some embodiments, validation engine 206 is configured to compare a set of validation constraints to an ontological graph that is currently being edited/generated within the visual input area of a user interface for graph creation (e.g., an ontology editor user interface, a search query input user interface, an annotation user interface). In the event that validation engine 206 determines that a portion of the ontological graph is not valid in accordance with the set of validation constraints, then validation engine 206 presents a prompt at the user interface to cause the user to edit the graph in the visual input area in a manner that would cause the resulting graph to become valid at a subsequent check. In some embodiments, the set of validation constraints can be determined based on a standard (e.g., RDF) or configured by a user. For example, a validation constraint can define valid logical relationships between nodes (e.g., a person cannot be his or her own parent). In another example, a validation constraint can define that a node must be connected to at least one other node via an edge. In yet another example, a validation constraint can require a specified type of node or edge to be included in the ontological graph.

Mapping storage 208 is configured to store mapping logic that is configured to map an ontological graph (e.g., stored at graph storage 204) to structured data. For example, the structured data could be knowledge base data (e.g., data stored in tables). In some embodiments, the mapping logic corresponding to an ontological graph is computer program code that is generated based at least in part on the names, types, and relationships that are described by the nodes and edges of the ontological graph. In some embodiments, the execution of mapping logic associated with an ontological graph would associate/map the nodes and edges of the ontological graph to the relevant columns, rows, and/or other labels associated with the structured data. Put another way, the execution of mapping logic associated with an ontological graph against target structured data would populate the graph with the relevant portions of the structured data. The result of populating the graph with relevant portions of the structured data is a knowledge graph.

Graph-based search engine 210 is configured to present a search query input user interface at a client device. For example, graph-based search engine 210 is configured to present the search query input user interface at a website. As mentioned above, the search query input user interface comprises a visual input area and a set of editing tools, similar to an ontology editor user interface, to enable a searching user to add nodes and edges between nodes in the visual input area. In addition, the search query input user interface comprises an interactive element that in response to a user selection, presents information associated with subgraphs that can be imported into the visual input area. One or more subgraphs can be imported into the visual input area similar to what is described above for the ontology editor user interface. In some embodiments, graph-based search engine 210 is configured to use the nodes, edges, and imported subgraph(s) of the ontological graph that have been input into the visual input area of the search query user interface as a search query to search against structured data (e.g., knowledge base data such as data stored in tables or knowledge graph data, as described above). The portions of the searched structured data that match the user defined ontological graph-based search query are then presented by graph-based search engine 210 at a search results user interface. Allowing a search query to include an ontological graph increases the richness and complexity with which the desired data instances can be described, especially by non-technical users. For example, a search query that comprises an ontological graph can describe complex relationships between resources that cannot be captured by a keyword-based search or by a simple database query. In some embodiments, the user-defined ontological graph-based search query is also evaluated by validation engine 206 for validity. In the event that validation engine 206 determines that the search query graph is not valid, then validation engine 206 is configured to present a corresponding prompt at the search query input user interface.

Annotation job collection engine 212 is configured to collect information pertaining to annotation jobs. In some embodiments, annotation job collection engine 212 is configured to provide a user interface to an annotation job creator user at that user's corresponding annotation job management device. The user interface would enable the annotation job creator user to submit information pertaining to a new or an existing annotation job to annotation job collection engine 212. Examples of information pertaining to a new or an existing annotation job may include at least a set of raw input data, one or more selected ontologies, and contributor user criteria. In some embodiments, the raw input data comprises text data, image data, audio data, video data, virtual reality data, or other media content. In some embodiments, if the raw input is not already divided into discrete units, annotation job collection engine 212 is configured to divide the raw input data into discrete units. In some embodiments, the contributor user criteria that are received by annotation job collection engine 212 is associated with desired annotator users to whom the raw input data is to be distributed for the purposes of performing annotations. After receiving information pertaining to an annotation job from an annotation job management device, annotation job collection engine 212 is configured to store the obtained information associated with the annotation job at annotation jobs storage 214. In some embodiments, annotation job collection engine 212 is further configured to keep track of the current status of the annotation job such as, for example, which units of the raw input data have been annotated by one or more annotator users. In some embodiments, annotation job collection engine 212 is configured to present a user interface at the annotation job management device describing the current status of the annotation job.

Assignment engine 216 is configured to send job batches associated with an annotation job to annotator users with respect to the annotation job. In some embodiments, a job batch comprises one or more units of the input data associated with the annotation job. For each unit of input, assignment engine 216 is configured to perform additional segmentation. For example, if the unit of input data included text, then the text can be programmatically segmented into discrete tokens (e.g., semantically meaningful words and/or phrases). In another example, if the unit of the input data included images, then an image can be programmatically segmented/labeled with bounding boxes around portions of interest within that image (e.g., using machine learning). Assignment engine 216 is further configured to present units of input data associated with a job batch at an annotator user interface at an annotator device of an annotator user to whom the job batch is assigned. For example, assignment engine 216 is configured to present the search query input user interface at a website. As mentioned above, the annotation user interface comprises a visual input area and a set of editing tools, similar to an ontology editor user interface, to enable an annotator user to add nodes and edges between nodes in the visual input area. In addition, the annotation user interface enables annotators to define new and/or link existing specific segments in the unstructured input data (e.g., tokens, bounding boxes) with nodes and/or edges defined or imported in the visual input area. In addition, the annotator user interface comprises an interactive element that in response to a user selection, presents information associated with subgraphs that can be imported into the visual input area. One or more subgraphs can be imported into the visual input area and associated with other nodes/edges in the visual input area similar to what is described above for the ontology editor user interface. Furthermore, assignment engine 216 is further configured to compare tokens/labels associated with segments of a unit of input data against the names of nodes and/or edges of the one or more ontologies that been selected/specified for the given annotation job. If assignment engine 216 determines potential matches in the one or more ontologies, assignment engine 216 is configured to present the potential matches (e.g., potentially matching nodes) corresponding to each segment within the presented unit of input data (e.g., in an expandable menu) so that the annotator user can select one of such matches to populate into the annotator user interface's visual input area. In some embodiments, the annotator user can also rename a node that had been populated/added into the visual input area with a value/name/label associated with a segment within a unit of input data that is presented at the annotator user interface. The resulting ontological subgraph that is generated in the visual input area of the annotator user interface is an annotation (or something referred to as an "annotation result") corresponding to and linked to the unit of input data that is presented at the annotator user interface and is stored by assignment engine 216 at annotation results storage 220. In some embodiments, the user-defined ontological graph-annotation to the presented unit of input data is also evaluated by validation engine 206 for validity. In the event that validation engine 206 determines that the annotation graph is not valid, then validation engine 206 is configured to present a corresponding prompt at the annotation user interface.

Aggregate annotation report engine 218 is configured to generate an aggregate annotation report corresponding to an annotation job based on annotation results that have been received from annotator devices for the input data associated with the annotation job. In some embodiments, aggregate annotation report engine 218 is configured to collect all the annotation results that have been collected at annotation results storage 220 for each unit of the input data associated with the annotation job. In some embodiments, for each unit in the input data associated with the annotation job, aggregate annotation report engine 218 is configured to group together all the received annotation results with respect to that unit. Then, for each unit of the input data, aggregate annotation report engine 218 is configured to determine an aggregated annotation from the group of annotation results associated with that unit. In an example, the aggregated annotation corresponding to a unit is determined as the most frequently occurring annotation result that had been submitted for the unit (while other annotation results that had been submitted for the unit are discarded or at least excluded from the aggregate annotation report). As such, in various embodiments, the aggregate annotation report corresponding to the annotation job comprises, for each unit of the input data associated with the annotation job, aggregated annotations determined based on aggregated annotation results corresponding to each unit of the input data. In some embodiments, aggregate report engine 218 is also configured to return statistical evaluations of annotation jobs such as inter-annotator-agreement scores. In some embodiments, annotation results storage 220 is configured to send the aggregate annotation report corresponding to the annotation job to the annotation job management device from which the annotation job was received. In some embodiments, annotation results storage 220 is configured to generate a visual presentation based on the aggregate annotation report corresponding to the annotation job and then cause the visual presentation to be presented at the annotation job management device from which the annotation job was received. The annotation job creator user that had created the annotation job can then use the received aggregate annotation report as training data to build a new or update an existing machine learning model.

Figure 3:
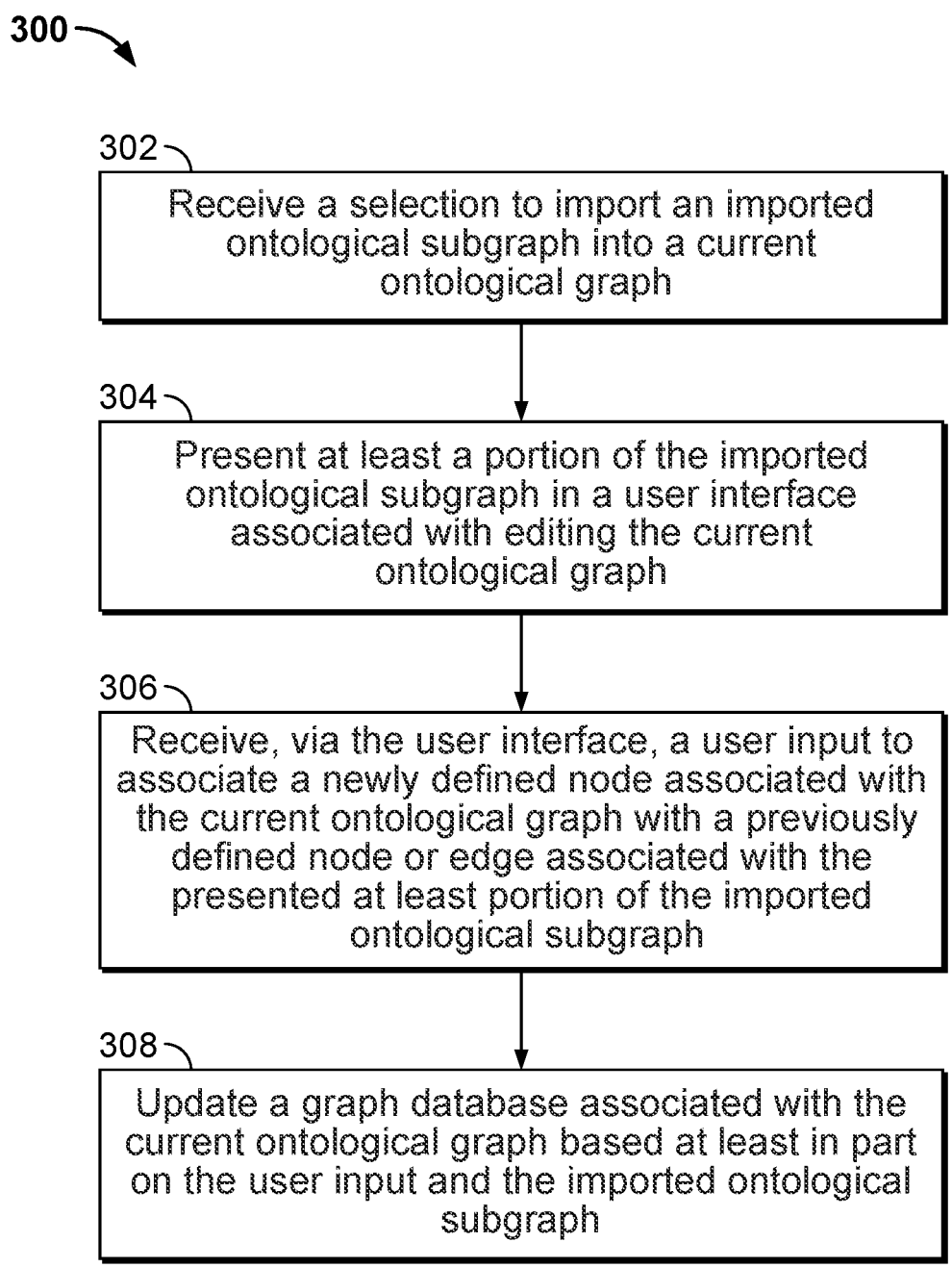
FIG. 3 is a flow diagram showing an embodiment of a process for creating an ontological graph via a user interface.

FIG. 3 is a flow diagram showing an embodiment of a process for creating an ontological graph via a user interface. In some embodiments, process 300 represents an entire process for creating an ontological graph. In some embodiments, it represents part of a larger process containing one or more of such individual processes. In some embodiments, process 300 is implemented at an ontology generation and annotation platform server (e.g., ontology generation and annotation platform server 116 of FIG. 1).

At 302, a selection to import an imported ontological subgraph into a current ontological graph is received. A current ontological graph is being edited/created within a visual input area of an ontology editor user interface. As described above, the ontology editor user interface can provide the visual input area as well as a set of editing tools to enable an ontology editor user to add nodes and edges between nodes in the visual input area to form the current ontological graph. The ontological subgraph selected for import may be a predefined subgraph or a subgraph that was previously user defined using the ontology editor user interface.

At 304, at least a portion of the imported ontological subgraph is presented in a user interface associated with editing the current ontological graph. In some embodiments, less than all of the selected ontological subgraph is to be presented as individual nodes/edges within the visual input area of the ontology editor user interface. In some embodiments, only the portion of the imported ontological subgraph that has been selected by the ontology editor user to be inherited by the current ontological graph is presented within the visual input area of the ontology editor user interface as individual nodes and/or edges. In some embodiments, the remaining (e.g., unselected) portion of the imported ontological subgraph is presented as a representation. In some embodiments, the representation that is presented instead of the individual nodes and/or edges of the unselected portion of the imported ontological subgraph can be determined based on heuristics and/or as a predetermined (e.g., thumbnail) image.

At 306, a user input to associate a newly defined node associated with the current ontological graph with a previously defined node or edge associated with the presented at least portion of the imported ontological subgraph is received via the user interface. A user input that associates at least a node of the imported ontological subgraph with a node of the current ontological graph that is being edited/created in the visual input area of the ontology editor user interface, is received. For example, the nodes of the current ontological graph and the imported ontological subgraph could be merged into one node. In another example, a new edge is added to connect the nodes of the current ontological graph and the imported ontological subgraph.

At 308, a graph database associated with the current ontological graph is updated based at least in part on the user input and the imported ontological subgraph. The relationships of the nodes and edges of the current ontological graph, including any incorporated imported ontological subgraphs, that are created in the visual input area of the ontology editor user interface are translated into a graph database or a portion thereof. In some embodiments, the graph database that includes a translated representation of the current ontological graph also stores a representation of the imported ontological subgraph. In some embodiments, the graph database can store the current ontological graph separately from the imported ontological subgraph but include in the representation of the current ontological graph, a reference to the representation of the imported ontological subgraph in the same graph database. In some embodiments, the graph database can store each created (e.g., the current ontological graph) or ingested graph or subgraph (e.g., the imported ontological subgraph or another ontological subgraph) separately from each other but also store references from one graph/subgraph to another (e.g., another subgraph that was imported into it at a user interface), if any. In some embodiments, the graph database can be stored as one or more files (or other types of containers/data objects).

Figure 4:
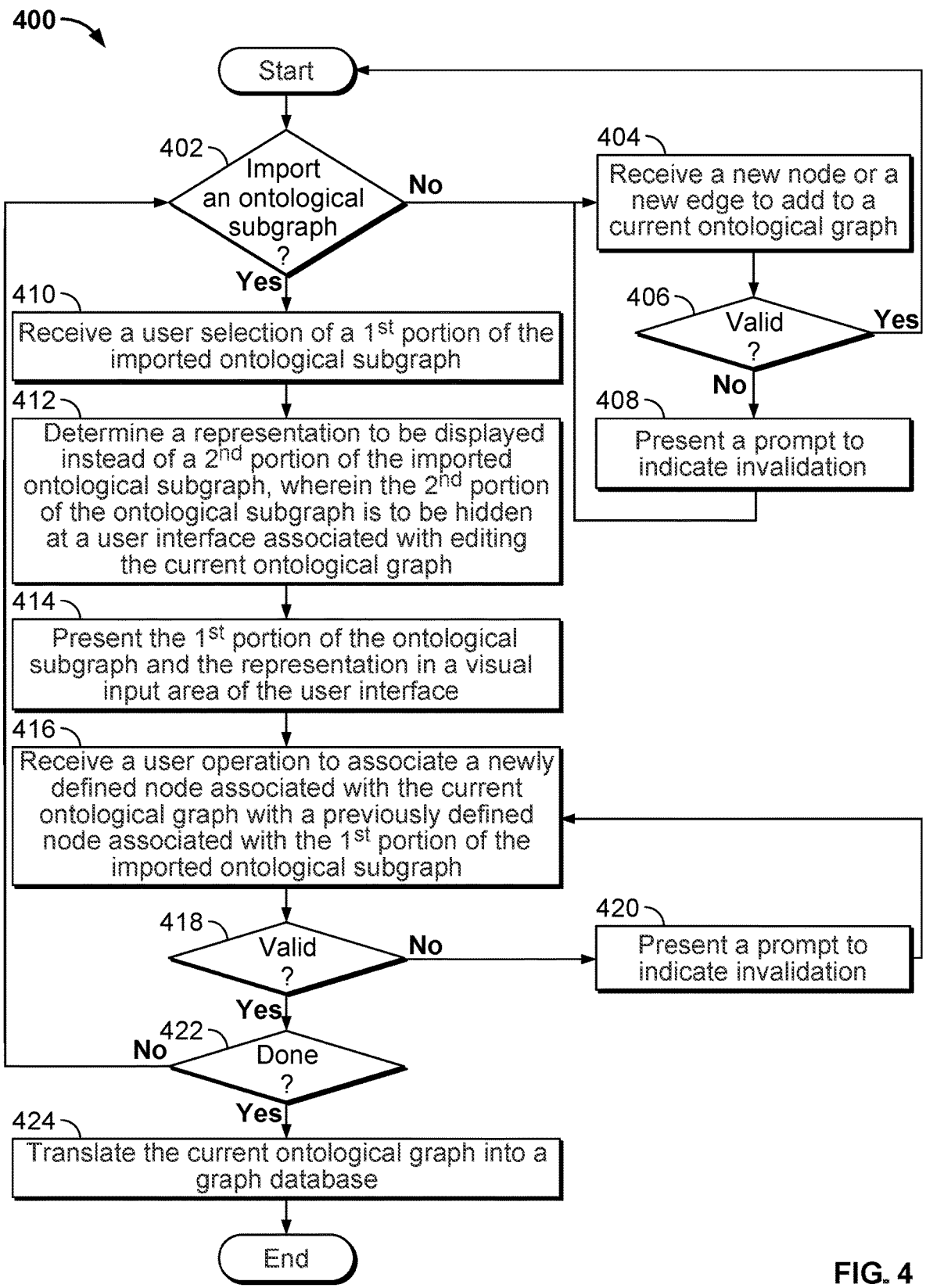
FIG. 4 is a flow diagram showing an example of a process for creating an ontological graph via an ontology editor user interface.

FIG. 4 is a flow diagram showing an example of a process for creating an ontological graph via an ontology editor user interface. In some embodiments, process 400 is implemented at an ontology generation and annotation platform server (e.g., ontology generation and annotation platform server 116 of FIG. 1). In some embodiments, process 300 of FIG. 3 can be implemented, at least in part, by process 400.

At 402, whether an ontological subgraph is to be imported is determined. In the event that an ontological subgraph is to be imported, control is transferred to 410. Otherwise, in the event that an ontological subgraph is not to be imported, control is transferred to 404. To initiate the importing of an ontological subgraph (which is sometimes referred to as a "schema" herein) into an ontological graph that is currently being edited/created in the ontology editor user interface, an interactive element (e.g., a button) associated with importing subgraphs that is presented at the user interface is selected by the ontology editor user. In response to the selection of that interactive element, in some embodiments, a set of candidate subgraphs to import is presented in a window. The subgraph that is selected by the user is then presented within the visual input area of the ontology editor user interface.

At 404, a new node or a new edge to add to a current ontological graph is received. Regardless of whether an ontological subgraph is imported, the ontology editor user can add a new node or a new edge into the current graph that is being edited/created at the visual input area. For example, to add a new node or a new edge, an interactive element (e.g., radio button or other menu) is selected by the ontology editor user for the desired type of node or edge to add. In response to the user selection of the desired type of node/edge, a corresponding representation of the selected type of node/edge is then populated/presented within the visual input area. The newly populated/presented node/edge can then be manipulated by the user (e.g., using a cursor) to a location within the current graph that is being edited/created and also, optionally, renamed. For example, the representation of a new node (e.g., a circle) can be moved near to another node to which the new node is connected or to be connected via an edge and also renamed with a corresponding new node name. In another example, the representation of a new edge (e.g., a line) can be moved near to a node to which the new edge is to connect to another node and also renamed with a corresponding new edge name.

At 406, whether the new node or the new edge is valid is determined. In the event that the new node or the new edge is valid, control is returned to 402. Otherwise, in the event that the new node or the new edge is invalid, control is transferred to 408. The validity of the placement of the new node or the new edge within the current graph that is presented in the visual input area is checked against logic validation rules, semantic validation rules, standards-based validation rules, and/or other configured rules. For example, a validation rule can dictate whether an edge of edge type A can be placed between a first node of type B and a second node of type C. In another example, a validation rule can require that a node has to be connected to at least one other node (i.e., a node cannot be not connected to any other nodes). In yet another example, a validation rule can dictate that a relation cannot be reflexive, e.g., a node representing a child cannot also be designated as its own parent.

At 408, a prompt to indicate invalidation is presented. If the placement of the new node or the new edge is not valid, then a prompt describing the invalidity (e.g., the violated validation rule) can be presented to inform the ontology editor user to edit the placement/naming of the new node/edge to remove the invalidation.

At 410, a user selection of a first portion of the imported ontological subgraph is received. In the event that an ontological subgraph has been selected to be imported into the current graph, in some embodiments, a preview of the selected ontological subgraph is presented in a new window and the ontology editor user can select a portion of the previewed subgraph to actually display as individual node(s) and/or edge(s) within the visual input area in which the current graph is being edited/created. As mentioned above, the selected node(s) and/or edge(s) are sometimes referred to as being "inherited" by the current graph.

At 412, a representation to be displayed instead of a second portion of the imported ontological subgraph is determined, wherein the second portion of the ontological subgraph is to be hidden at a user interface associated with editing the current ontological graph. The portion of the imported subgraph that is not selected to be inherited by the current graph will not be presented as individual nodes and/or edges. Instead, this unselected portion of the imported subgraph will be hidden in the visual input area of the ontology editor user interface and presented as a determined representation. In some embodiments, the representation is a predetermined image. For example, the predetermined image to use as the representation for the unselected portion of an imported subgraph can be determined based on heuristics associated with historical user activity with respect to that imported subgraph.

At 414, the first portion of the ontological subgraph and the representation are presented in a visual input area of the user interface. The inherited/selected portion of the imported subgraph is presented as individual nodes and/or edges while the uninherited/unselected portion of the imported subgraph is presented as the representation. Because the uninherited/unselected portion of the imported subgraph is not expected to be directly connected with the nodes/edges of the current graph in the visual input area, they are hidden/obscured by virtue of being presented as a single representation, so as to reduce the amount of space they take up within the visual input area and also not distract from the presentation of the inherited/selected portion of the imported subgraph.

At 416, a user operation to associate a newly defined node associated with the current ontological graph with a previously defined node associated with the first portion of the imported ontological subgraph is received. After the selected and unselected portions of the imported subgraph are presented within the visual input area of the ontology editor user interface, the ontology editor user can associate a presented, inherited node of the imported subgraph with a defined node for the current graph. For example, the defined node for the current graph may be a node that is added to the current graph by the user or a node that has been inherited from a different subgraph that had been imported into the current graph. In a first example, the ontology editor user can associate a presented, inherited node of the imported subgraph with a defined node for the current graph by merging the two nodes into a single node of the current graph. In a second example, the ontology editor user can associate a presented, inherited node of the imported subgraph with a defined node for the current graph by adding a new edge between the two nodes. In either example techniques of associating the nodes, the user can also rename an inherited node from the imported subgraph. In some embodiments, an ontology editor user may interact with the unselected portion of an imported subgraph in order to select and inherit additional nodes/edges from that subgraph.

At 418, whether the association is valid is determined. In the event that the association is valid, control is transferred to 422. Otherwise, in the event that the association is invalid, control is transferred to 420. Similar to the validation check described at step 406, the user defined association between the inherited node of the imported subgraph with a defined node for the current graph is checked against validation rules to determine whether any such rules have been violated.

At 420, a prompt to indicate invalidation is presented. If the association is not valid, then a prompt describing the invalidity (e.g., the violated validation rule) can be presented to inform the ontology editor user to edit the new association between nodes to remove the invalidation.

At 422, whether editing on the current ontological graph is done is determined. In the event that editing on the current ontological graph is done, control is transferred to 424. Otherwise, in the event that editing on the current ontological graph is not done, control is returned to 402. For example, whether editing on the current graph is done is determined based on whether the user had selected an interactive element associated with closing the ontology editor user interface for editing/creating the current graph. Otherwise, if editing on the current graph is not completed, control is returned to 402 to determine whether another subgraph is to be imported into the visual input area of the user interface.

At 424, the current ontological graph is translated into a graph database. After the current session of editing/creating the current graph is determined to have been completed, the relationships as described by user defined nodes, edges between nodes, and the zero or more imported subgraphs within the visual input area are translated into a single graph database (e.g., in JanusGraph format). Put another way, in some embodiments, references to subgraphs that have been imported into the current graph are stored in the representation of the current graph in a graph database. In some embodiments, the translation into a single graph database notated as 424 occurs sequentially as indicated in process 400; in some embodiments, this translation occurs in real time immediately following user actions at 402, 404, 410, and 416. Thus, 424 may be a separate process as indicated in flow chart 400 or it may be a component of other elements of 400. In some embodiments, the graph database can also be converted into a universal or proprietary text-based format that can then be consumed by other graph visualizing tools to visualize the relationships between the nodes and edges of the current graph, inclusive of the relationships defined by the nodes and edges of its imported subgraphs. In some embodiments, the current graph that is created using process 400 can be imported as a subgraph into another graph that is edited in the visual input area of an ontology editor user interface. In some embodiments, the current graph that is created using process 400 can be used as an ontology to use to generate an ontological graph-based annotation of input data, as will be described in further detail below.

Figure 5:
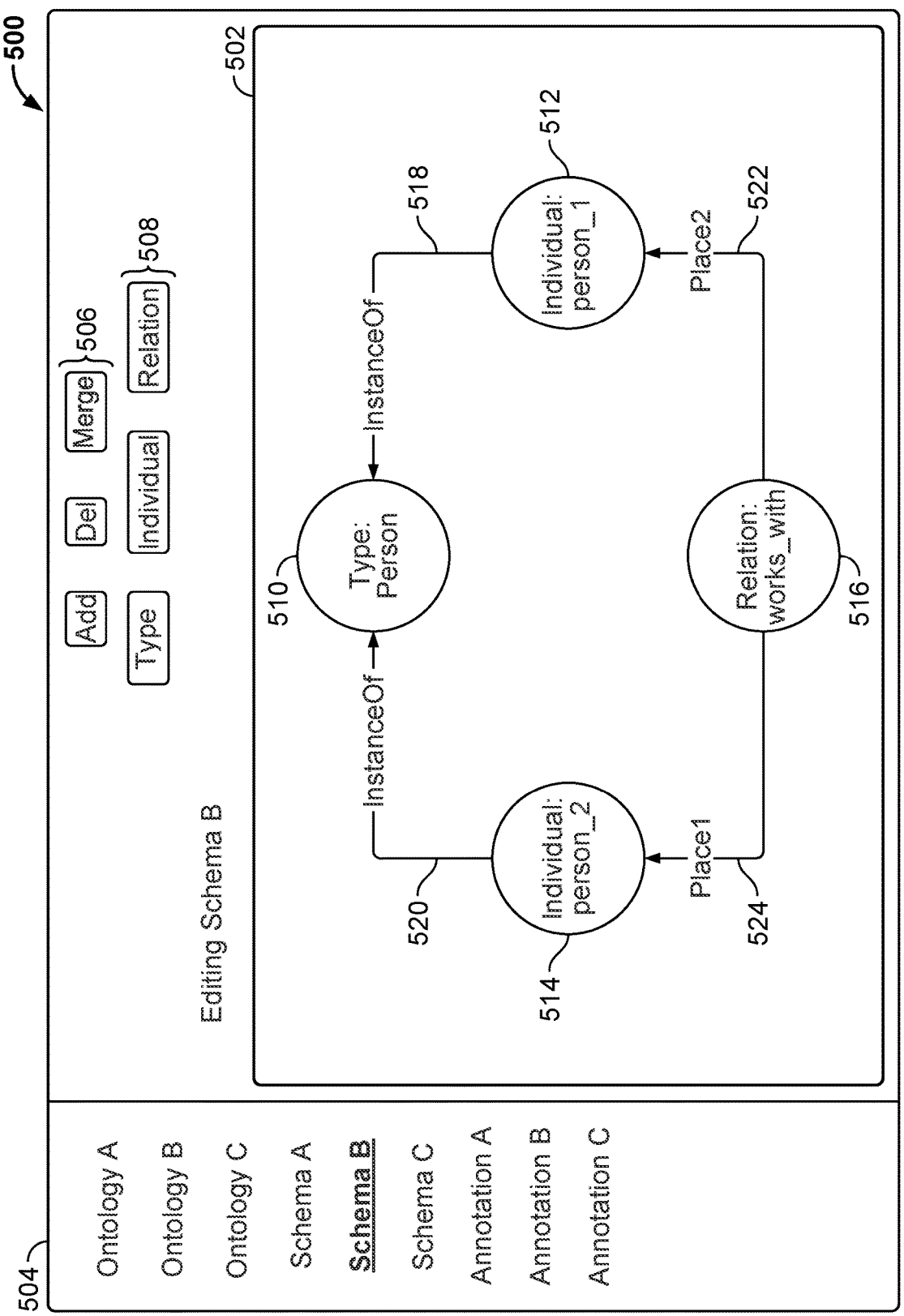
FIG. 5 is a diagram showing an example ontology editor user interface that is being used to edit an ontological subgraph that illustrates a coworking relationship between two individuals.

FIG. 5 is a diagram showing an example ontology editor user interface that is being used to edit an ontological subgraph that illustrates a coworking relationship between two individuals. Menu 504 shows a list of subgraphs that can be opened and edited within visual input area 502 of ontology editor user interface 500. For example, in menu 504, "Ontology A," "Ontology B," and "Ontology C" each represents a graph that describes an ontology. In menu 504, "Schema A," "Schema B," and "Schema C" each represents an ontological subgraph that describes relationships associated with a smaller set of nodes. In menu 504, "Annotation A," "Annotation B," and "Annotation C" each represents a subgraph that annotates a corresponding input data. As shown in the example of FIG. 5, "Schema B" within menu 504 had been selected and as such, the nodes and edges of the Schema B subgraph are presented within visual input area 502. In the example of FIG. 5, ontological Schema B subgraph describes a coworking ("works_with") relationship between two individual people ("person_1" and "person_2"). Specifically, ontological Schema B subgraph could have been edited/created in the ontology editor user interface by the following example steps: An ontology editor user selected "Type" button of editing interactive elements 508 to select a kind of node and then selected the "Add" button of editing interactive elements 506 populate type node 510 into visual input area 502, which the user then renamed as "Person" to designate that "Type" node to represent the ontological type "Person". The user then selected the "Individual" button of editing interactive elements 508 and the "Add" button of editing interactive elements 506 to populate type node 512 into visual input area 502, which the user then renamed as "person_1" to designate that "Individual" node to be associated with a first instance of an individual person. Similarly, the user selected the "Individual" button of editing interactive elements 508 and the "Add" button of editing interactive elements 506 again to populate type node 514 into visual input area 502, which the user then renamed as "person_2" to designate that "Individual" node to be associated with a second instance of an individual person. The user then selected "Individual: person_1" node 512 and, subsequently, "Type: Person" node 510 to trigger a pop-up menu (not shown) enabling the user to populate edge 518 between "Individual: person_1" node 512 and "Type: Person" node 510 and to designate edge 518 as an "instanceOf" edge to indicate that "Individual: person_1" node 512 is an instance of "Type: Person" node 510. Similarly, the user selected "Individual: person_2" node 514 and, subsequently, "Type: Person" node 510 to trigger a pop-up menu (not shown) enabling the user to populate edge 520 between "Individual: person_2" node 514 and "Type: Person" node 510 and to designate edge 520 as an "instanceOf" edge to indicate that "Individual: person_2" node 514 is another instance of "Type: Person" node 510. The user selected the "Relation" button of editing interactive elements 508 and then the "Add" button of interactive elements 506 to populate type node 516 into visual input area 502, which the user then renamed as "works_with" to designate that "Relation" node describes a coworking relationship. The user then selected "Relation: works_with" node 516 and, subsequently, "Individual: person_1" node 512 to trigger a pop-up menu (not shown) enabling the user to populate edge 522 between "Relation: works_with" node 516 and "Individual: person_1" node 512 and designate it as a "Place2" edge.

Similarly, the user selected "Relation: works_with" node 516 and, subsequently, "Individual: person_2" node 514 to trigger a pop-up menu (not shown) enabling the user to populate edge 522 between "Relation: works_with" node 516 and "Individual:person_2" node 514 and designate it as a "Place1" edge. Together, these last 2 selections indicate that "Individual: person_2" node 514 also belongs to the coworking relationship with "Individual: person_1" node 512. This example is predicated on the use of a particular ontology and schema. In some embodiments a different ontology or schema is used and other kinds of nodes and edges (i.e., not "Type", "Individual", "Relation", "instanceOf", "Place1", and "Place2") are used.

FIGS. 6A-6D show an example of creating an ontological graph within the visual input area of an ontology editor user interface. As will be described below, the ontological "Works on Project" graph that is created across FIGS. 6A-6D describes the relationship between two employees who work on a project together. In some embodiments, process 500 of FIG. 5 can be used to create the ontological graph as described across FIGS. 6A-6D. While only the content within visual input area 602 is shown in the example depicted in FIGS. 6A-6D and not the tools and interactive elements of the ontology editor user interface, the tools and interactive elements shown for example ontology editor user interface 500 of FIG. 5 can apply to the example of FIGS. 6A-6D.

Figure 6A:
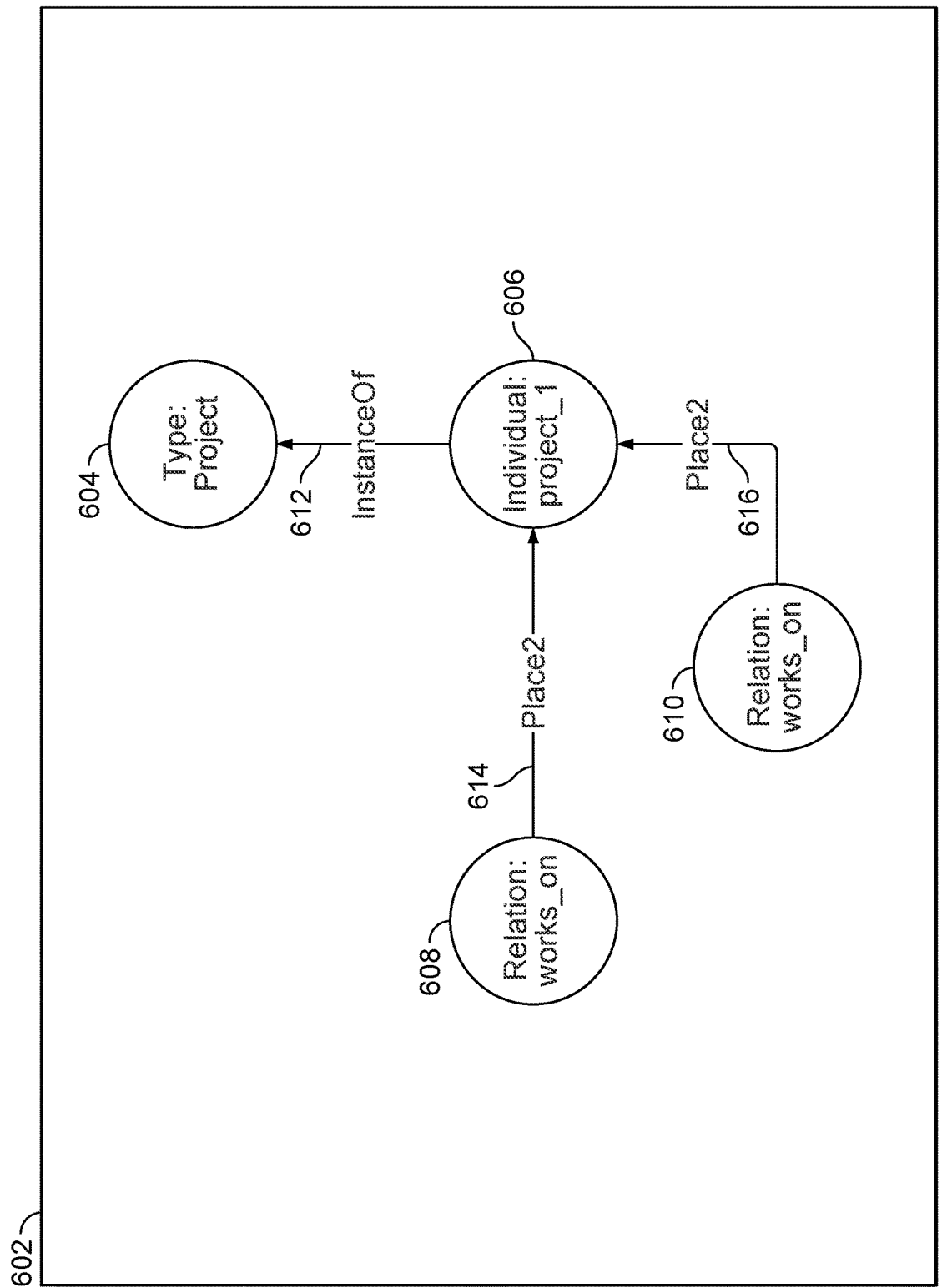
FIGS. 6A-6D show an example of creating an ontological graph within the visual input area of an ontology editor user interface.

FIG. 6A shows visual input area 602 of an ontology editor user interface in which an ontology editor user has defined, using the interactive elements and tools of the ontology editor user interface, "Individual: project_1" node 606 to be an instance of "Type: Project" node 604 via edge 612. Furthermore, in the example of FIG. 6A, the user had defined "Relation: works_on" node 608 and "Relation: works_on" node 610 each to take place with respect to "Individual: project_1" node 606 via edges 614 and 616.

To import into visual input area 602 an existing subgraph that already describes the coworking relationship between two individuals, the user can select an interactive element associated with importing a subgraph (not shown). After selecting the interactive element associated with importing a subgraph, a set of candidate subgraphs to import can be presented. While not shown, the user selects to import the coworking subgraph, Schema B, that was shown in FIG. 5.

Figure 6B:
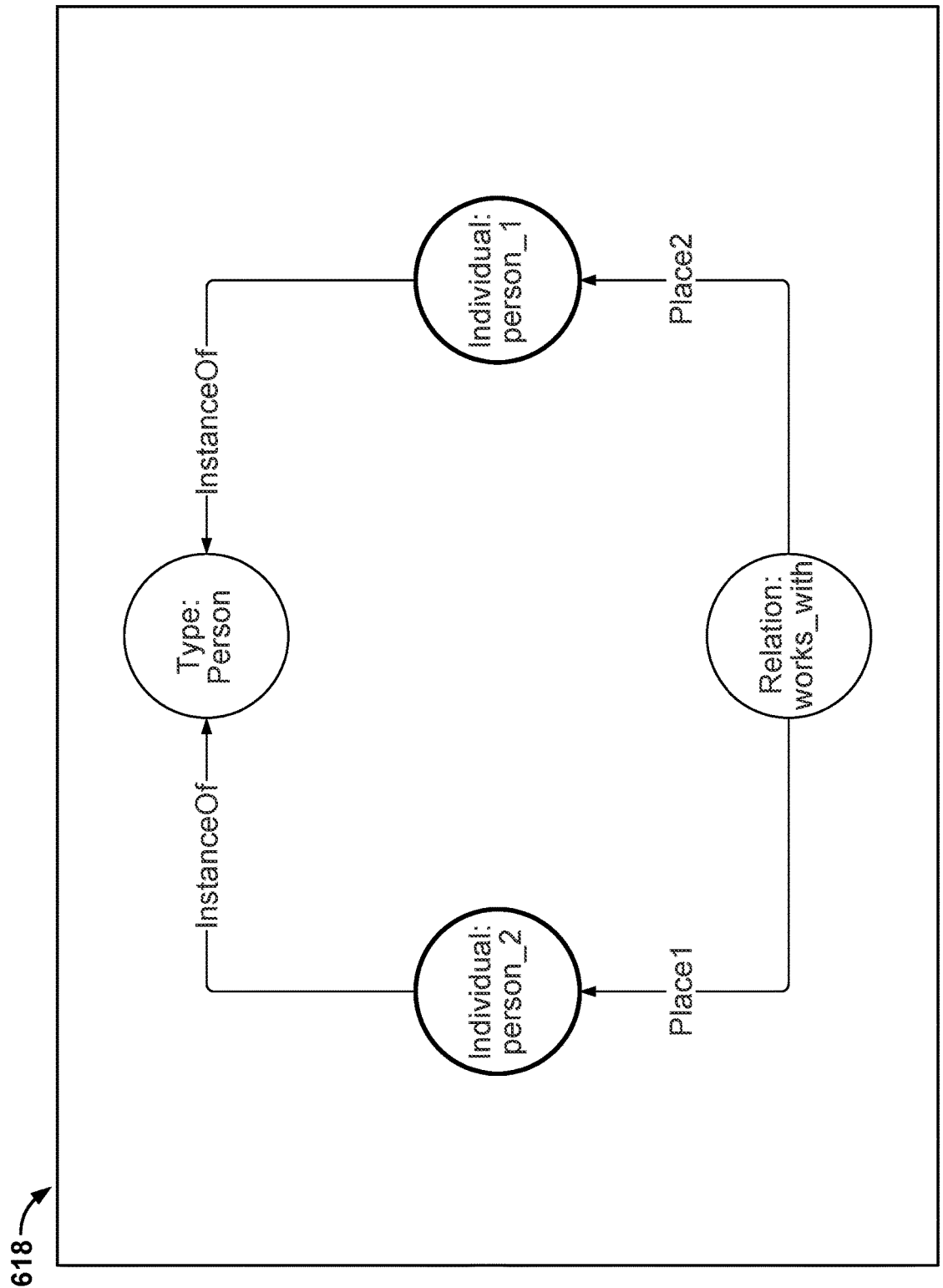

FIG. 6B shows preview 618 of the coworking subgraph after it was selected by the user to import into the "Works on Project" graph that is being edited/created in a visual input graph as shown in FIG. 6A. As mentioned above, the coworking subgraph shown in preview 618 is the same subgraph (Schema B) that had been shown in the visual input area of FIG. 5. Because the ontology editor user did not want to inherit every node/edge of the imported coworking subgraph into the current "Works on Project" graph, the user had selected only nodes "Individual: person_1" and "Individual: person_2," which are shown in bolded circles in FIG. 6B, from the coworking subgraph to inherit. As a result of the user's selection of nodes "Individual: person_1" and "Individual: person_2" to inherit, only those two nodes will appear unhidden, as individual node depictions in visual input area 602 for editing/creating "Works on Project" graph, while the unselected remaining nodes and edges will appear hidden and instead, represented by a predetermined representation.

Figure 6C:
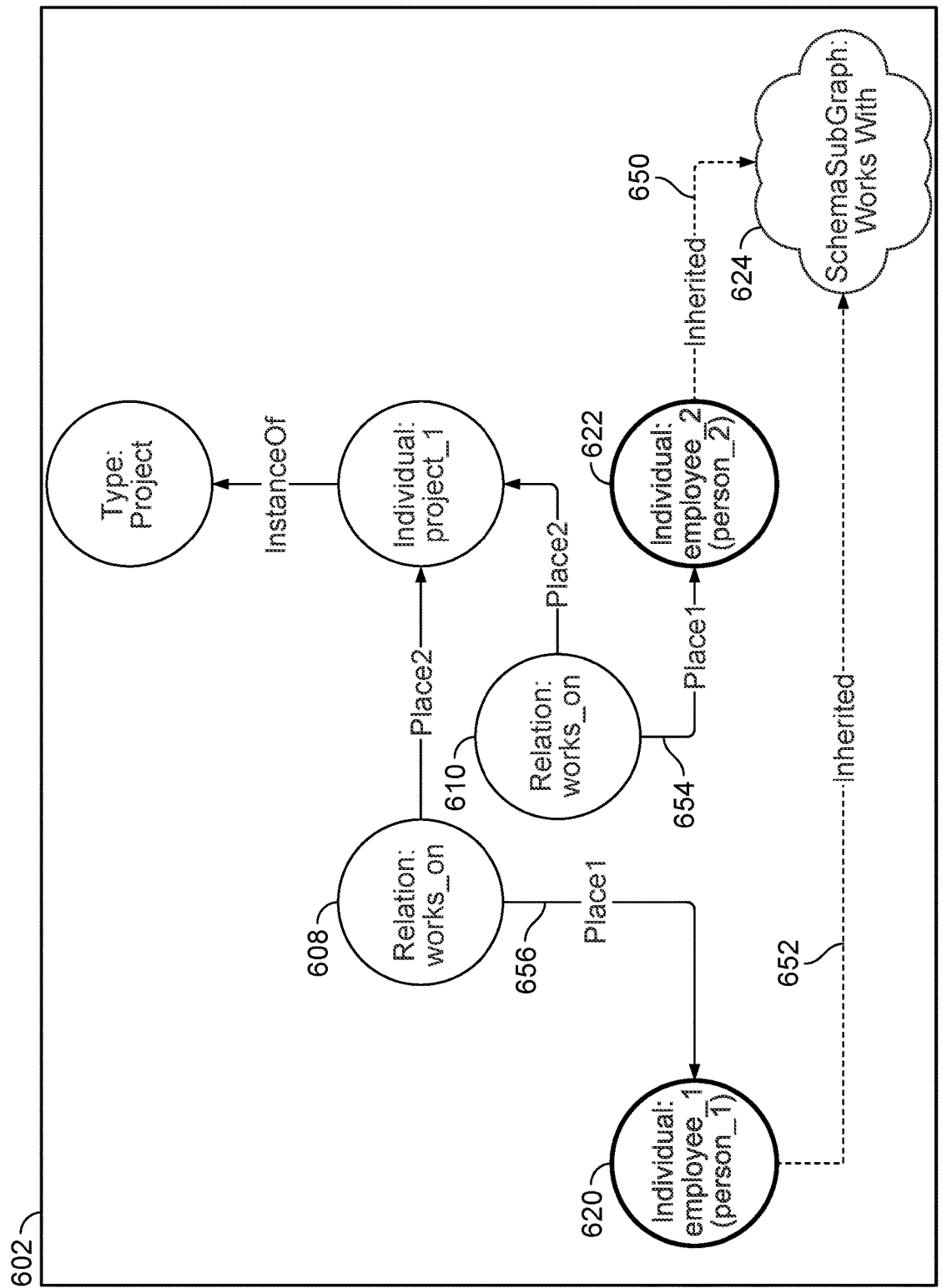

FIG. 6C shows the "Works on Project" graph in visual input area 602 after having imported the coworking subgraph. The selected "Individual: person_1" and "Individual: person_2" nodes to be inherited from the imported coworking subgraph are respectively renamed as "Individual: employee_1 (person_1)" and "Individual: employee_2 (person_2)" and also shown in bolded circles as nodes 620 and 622, respectively, in visual input area 602 of FIG. 6C. The unselected portion of the coworking subgraph is hidden and instead collectively shown as representation 624 within visual input area 602. The relationships between nodes "Individual: employee_1 (person_1)" 620 and "Individual: employee_2 (person_2)" 622 to representation 624 of the imported coworking subgraph are shown by "Inherited" edges (650 and 652) that connect nodes 620 and 622 and representation 624. Though representation 624 hides the unselected/uninherited nodes and edges of the imported coworking subgraph, nodes "Individual: employee_1 (person_1)" 620 and "Individual: employee_2 (person_2)" 622 inherit from the coworking subgraph the relationship that each node represents an instance of a "Type: Person" node and their mutual relationship of working together. The user defined an association between inherited "Individual: employee_1 (person_1)" node 620 and "Relation: works_on" node 608 by adding new edge 656 between those nodes and defined an association between inherited "Individual: employee_2 (person_2)" node 622 and "Relation: works_on" node 610 by adding new edge 654 between those nodes.

Figure 6D:
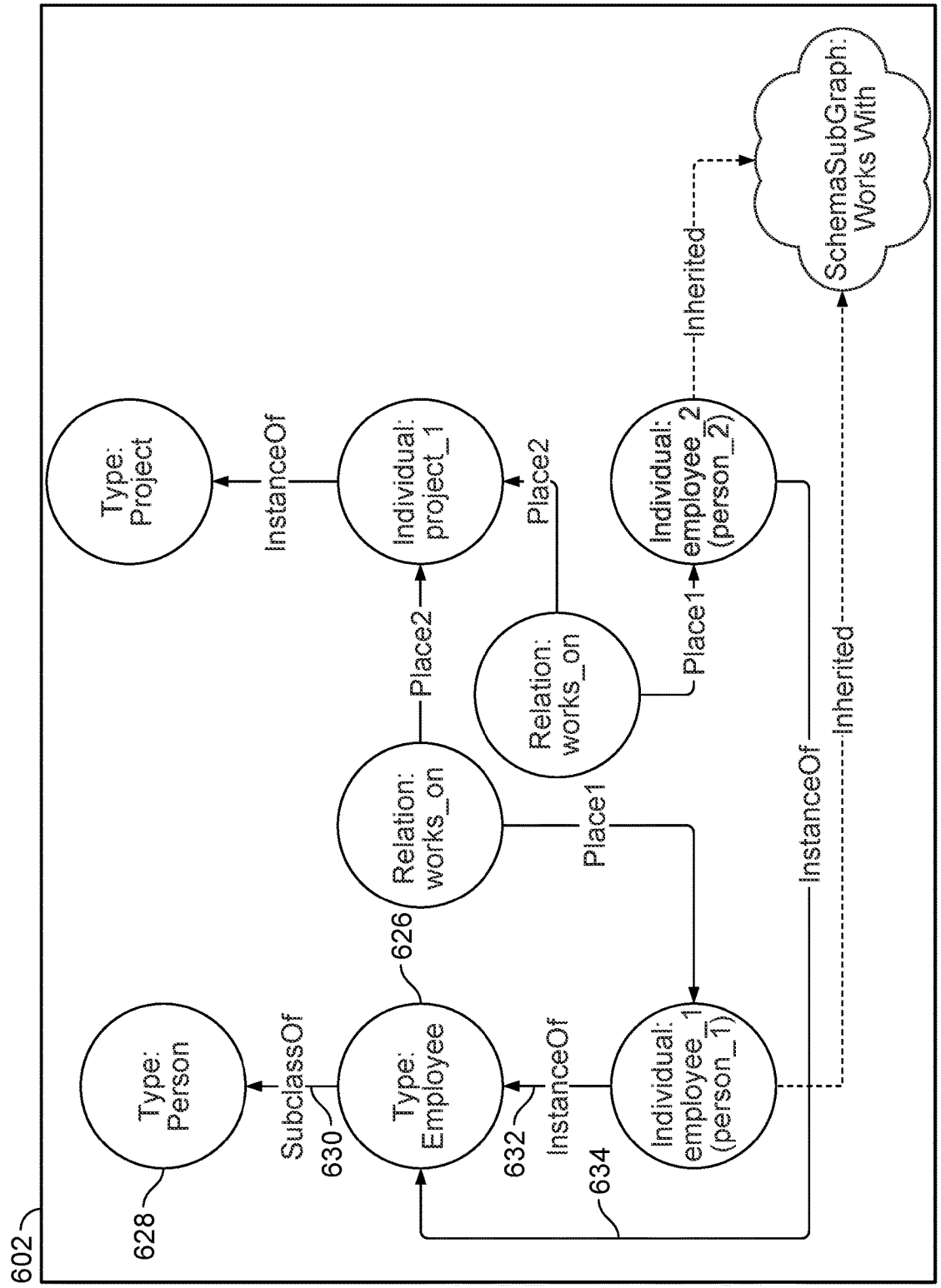

FIG. 6D shows the completed "Works on Project" graph in visual input area 602. Relative to the state of the "Works on Project" graph as shown in FIG. 6C, the user has defined new nodes "Type: Person" 628 and "Type: Employee" 626. Furthermore, the user had defined new edge 630 between nodes "Type: Person" 628 and "Type: Employee" 626 to indicate that "Type: Employee" node 626 is a subclass of "Type: Person" node 628. The user has also defined edge 632 between "Individual: employee_1 (person_1)" node and "Type: Employee" node 626 to indicate that Individual: employee_1 (person_1)" node is an instance of "Type: Employee" node 626. Similarly, the user has defined edge 634 between "Individual: employee_2 (person_2)" node and "Type: Employee" node 626 to indicate that "Individual: employee_2 (person_2)" node is another instance of "Type: Employee" node 626. Taken altogether, the completed ontological "Works on Project" graph as shown in FIG. 6D describes two individuals who are employees who also work together on the same project. As described above, a completed graph, such as "Works on Project" graph within visual input area 602, along with its imported subgraphs can be saved as a single graph database. The graph that has been defined in the visual input area of an ontology editor user interface can be imported as a subgraph into another larger graph or referred to as an ontology that is to be used to annotate input data. Furthermore, the graph that has been defined in the visual input area of an ontology editor user interface can also be mapped to specific instances of knowledge base data (e.g., data that is not in graph form but relational form, such as tables) to result in a structured, knowledge graph (e.g., specific instances of data that maps to the nodes and edges of an ontological graph). Specifically, the ontological "Works on Project" graph as shown in FIG. 6D can be mapped to knowledge base data that describes instances of actual employees at Company ACME and their respective working relationships.

Figure 7:
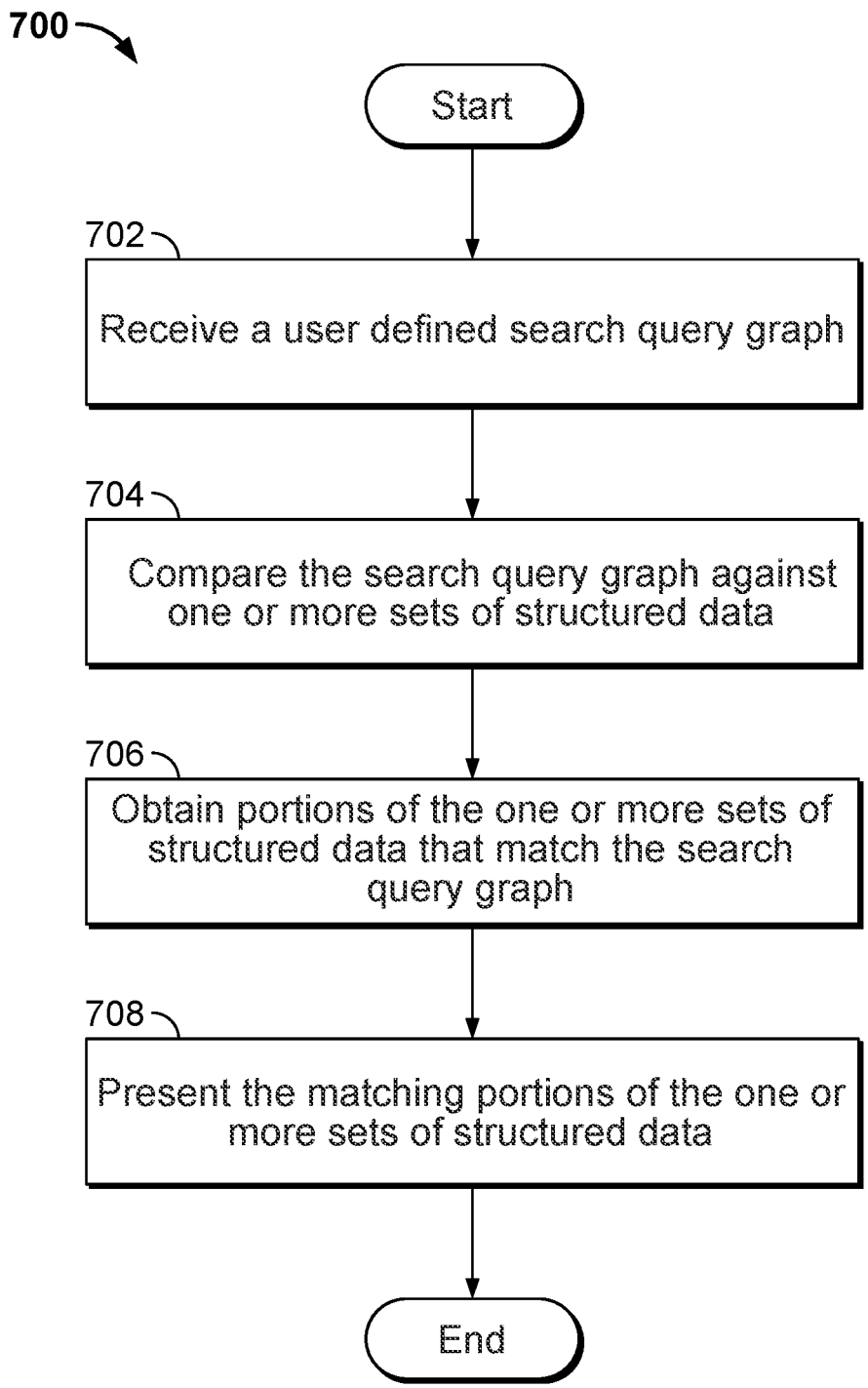
FIG. 7 is a flow diagram showing an example of a process for defining a search query comprising an ontological graph via a search query input user interface.

FIG. 7 is a flow diagram showing an example of a process for defining a search query comprising an ontological graph via a search query input user interface. In some embodiments, process 700 is implemented at an ontology generation and annotation platform server (e.g., ontology generation and annotation platform server 116 of FIG. 1).

Process 700 describes obtaining a search query that comprises an ontological graph, which is then searched again structured data. Allowing the search query to include a user defined ontological graph enables the search query to describe complex relationships between resources and their properties.

At 702, a user defined search query graph is received. In some embodiments, the user defined search query is defined in the visual input area of a search query input user interface. In some embodiments, the search query input user interface includes similar tools and interactive elements as the ontology editor user interface. As such, in some embodiments, the ontological graph that is to be used as a search query can be defined using a process such as process 300 of FIG. 3 or process 400 of FIG. 4. In some embodiments, the user defined search query takes the form of text written in a formal query language, which describes the configuration of elements in the search rather than representing them visually. In such embodiments, the descriptive search query is first interpreted by the ontology generation and annotation platform server into a search query graph before being received at 702.

At 704, the search query graph is compared against one or more sets of structured data. The ontological graph of the search query comprises nodes and edges that define types of resources and the properties of such resources. The search query graph comprising the ontological graph is compared against structured data, which may comprise either knowledge base data (e.g., specific instances of data stored in relational form) or knowledge graph data (e.g., specific instances of data that have been mapped to an ontological graph).

At 706, portions of the one or more sets of structured data that match the search query graph are obtained. Those specific instances within the structured data that include the resources and the relationships that are described by the search query graph are considered matching search results.

At 708, the matching portions of the one or more sets of structured data are presented. The matching search results are then presented at a user interface.

Figure 8:
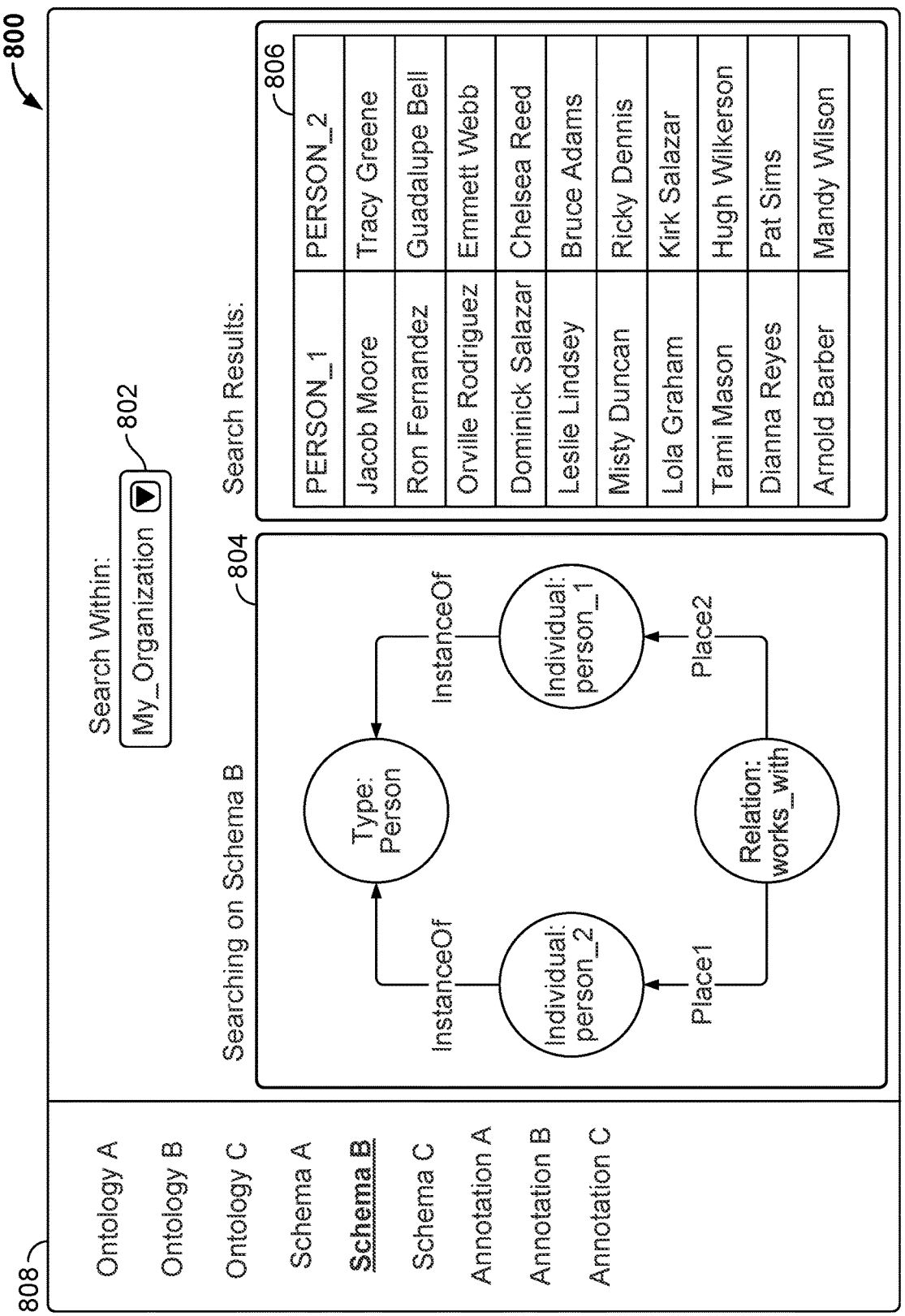
FIG. 8 is a diagram showing a search query input user interface and matching search results to a user defined search query.

FIG. 8 is a diagram showing a search query input user interface and matching search results to a user defined search query. As shown in FIG. 8, search query input user interface 800 includes menu 808, which includes a list of previously defined ontological graphs that can be selected to use as a search query. In the example of FIG. 8, the ontological subgraph of Schema B has been selected to serve as the search query and it is also presented in visual input area 804. As described in FIG. 5 above, Schema B describes the coworking relationship between two individual people. In the example of FIG. 8, the user can select a target set of structured data against which the selected search query (Schema B) is to be compared against. In the present example, the user has selected the set of structured data named "My_Organization" in dropdown menu 802. For example, the set of structured data named "My_Organization" may include specific instances of data (e.g., data describing relationships between employees in a company) in relational form or having been mapped to an ontological graph. As a result of comparing the ontological model of the selected search query (Schema B), the instances of specific data from "My_Organization" that match the two individual people's coworking relationship are shown in a table 806.

While not shown in FIG. 8, search query input user interface 800 can also include tools and interactive elements associated with defining a new ontological graph within visual input area 804 to use as a search query that is then searched against the selected set of structured data in dropdown menu 802.

Figure 9:
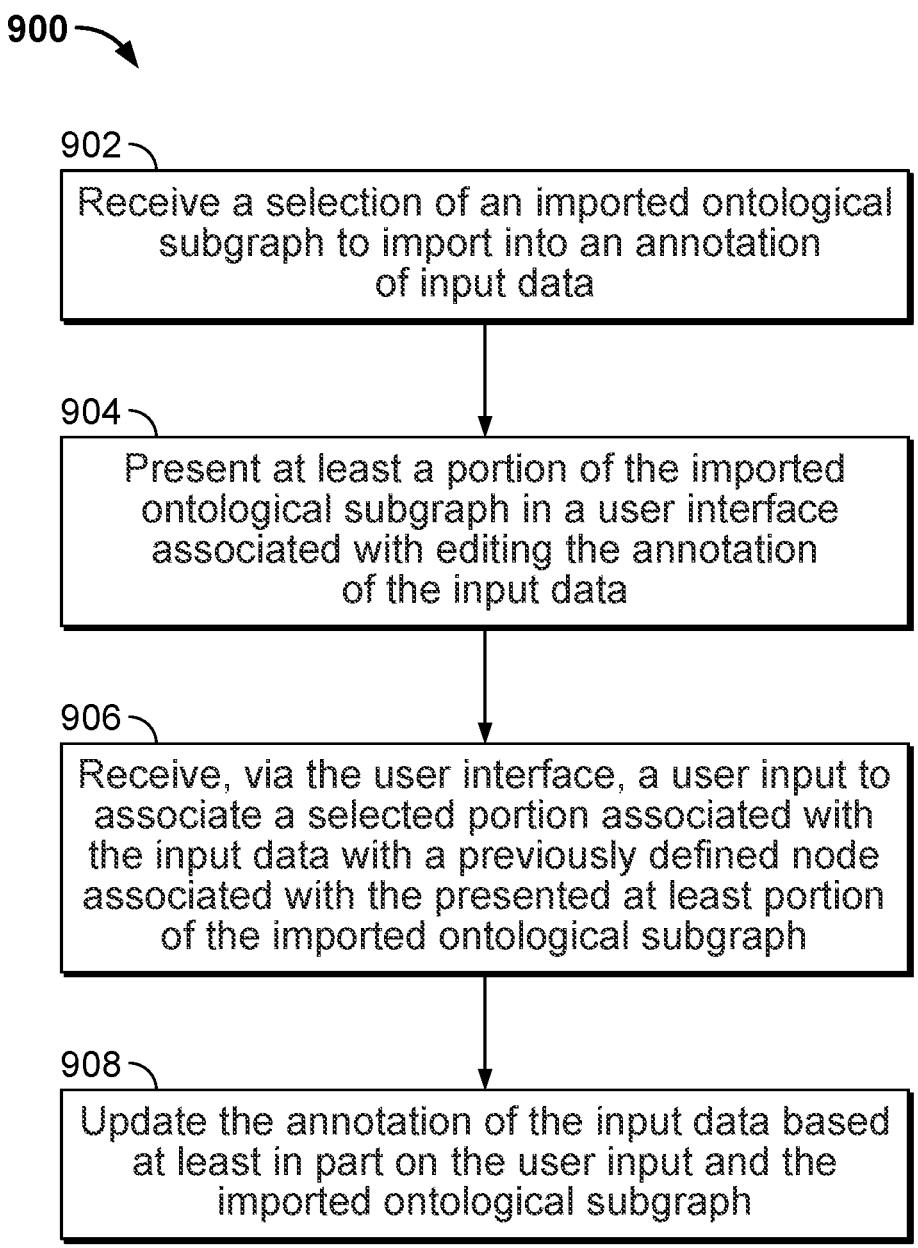
FIG. 9 is a flow diagram showing an embodiment of a process for generating an ontological subgraph-based annotation for input data.

FIG. 9 is a flow diagram showing an embodiment of a process for generating an ontological subgraph-based annotation for input data. In some embodiments, process 900 is implemented at an ontology generation and annotation platform server (e.g., ontology generation and annotation platform server 116 of FIG. 1).

Process 900 describes the generation of an ontological subgraph-based annotation of a given input data. The given input data comprises one or more units of input data that are associated with an annotation job. As described above, the annotation job including raw input data and selected one or more ontologies (which provide the content with which specific segments of the input data will be connected) is provided by an annotation job management user to the ontology generation and annotation platform server and in turn, the ontology generation and annotation platform server returns annotations to the raw input data, where the annotations comprise subgraphs generated from the selected ontology(-ies). Allowing a user defined annotation to each unit of input data to include a user defined ontological subgraph enables the annotation to describe complex relationships between portions of the input data and also relative to the one or more selected ontologies.

At 902, a selection of an imported ontological subgraph to import into an annotation of input data is received. In various embodiments, the "input data" comprises a portion (e.g., one or more units) of input data that has been divided from raw input data that has been provided with an annotation job. The one or more units of input data are presented at an annotator user interface, which provides a visual input area as well as a set of editing tools to enable an annotator user to add nodes and edges between nodes in the visual input area to form the ontological graph of the annotation to the given input data. Furthermore, the annotator user interface provides an interactive element to enable the annotator user to import a selected ontological subgraph into the visual input area of the annotator user interface. The selected ontological subgraph may be a predefined subgraph or a subgraph that was previously user defined using an ontology editor user interface, as described above, for example.

In some embodiments, the one or more units of the input data can be segmented. For example, if a unit of the input data included text, then the text can be programmatically or manually segmented into discrete tokens (e.g., words and/or phrases). In another example, if a unit of the input data included images, then an image can be programmatically or manually segmented/labeled with bounding boxes around portions of interest within that image (e.g., using machine learning). As will be described in further detail below, in some embodiments, the text-based tokens and/or the bounding box labels are compared against the names of nodes and edges of the selected ontologies associated with the annotation job. The matching nodes/edges of the selected ontologies for a particular segment (e.g., text or bounding box label) of the given input data can also be presented at the annotator user interface (e.g., in a dropdown menu next to that segment) to allow the annotator to select one such matching node/edge to populate into the visual input area of the annotator user interface to add to the annotation graph.

At 904, at least a portion of the imported ontological subgraph is presented in a user interface associated with editing the annotation of the input data. In some embodiments, less than all of the selected ontological subgraph is to be presented as individual nodes/edges within the visual input area of the annotator user interface. In some embodiments, only the portion of the imported ontological subgraph that has been selected by the annotator user to be inherited by the annotation graph is presented within the visual input area of the annotator interface as individual nodes and/or edges. In some embodiments, the remaining (e.g., unselected) portion of the imported ontological subgraph is presented as a representation. In some embodiments, the representation that is presented instead of the individual nodes and/or edges of the unselected portion of the imported ontological subgraph can be determined based on heuristics and/or as a predetermined (e.g., thumbnail) image.

At 906, a user input to associate a selected portion associated with the input data with a previously defined node associated with the presented at least portion of the imported ontological subgraph is received via the user interface. A user input can associate at least a node of the imported ontological subgraph that is presented in the visual input area of the annotation user interface with a portion of the input data. For example, an inherited node or edge of the imported subgraph can be renamed with a label or text of a segment of the given input data. In another example, an inherited node of the imported subgraph can be linked to a segment of the given input data via a new edge.

At 908, the annotation of the input data is updated based at least in part on the user input and the imported ontological subgraph. The relationships of the nodes and edges of the annotation graph, including the incorporated at least one imported ontological subgraph, that are created in the visual input area of the annotator user interface are also saved as an annotation result corresponding to the given input data. As will be described in further detail below, because the same unit of input data can be distributed to more than one annotator user, multiple sets of annotation results (annotation graphs) corresponding to the same unit of input data can be obtained. The annotation results obtained for the same unit of input data can then be compared against each other to determine an aggregate annotation result for that unit of input data, which is then included in the aggregate annotation report that is to be returned to the annotation job management device.

Figure 10:
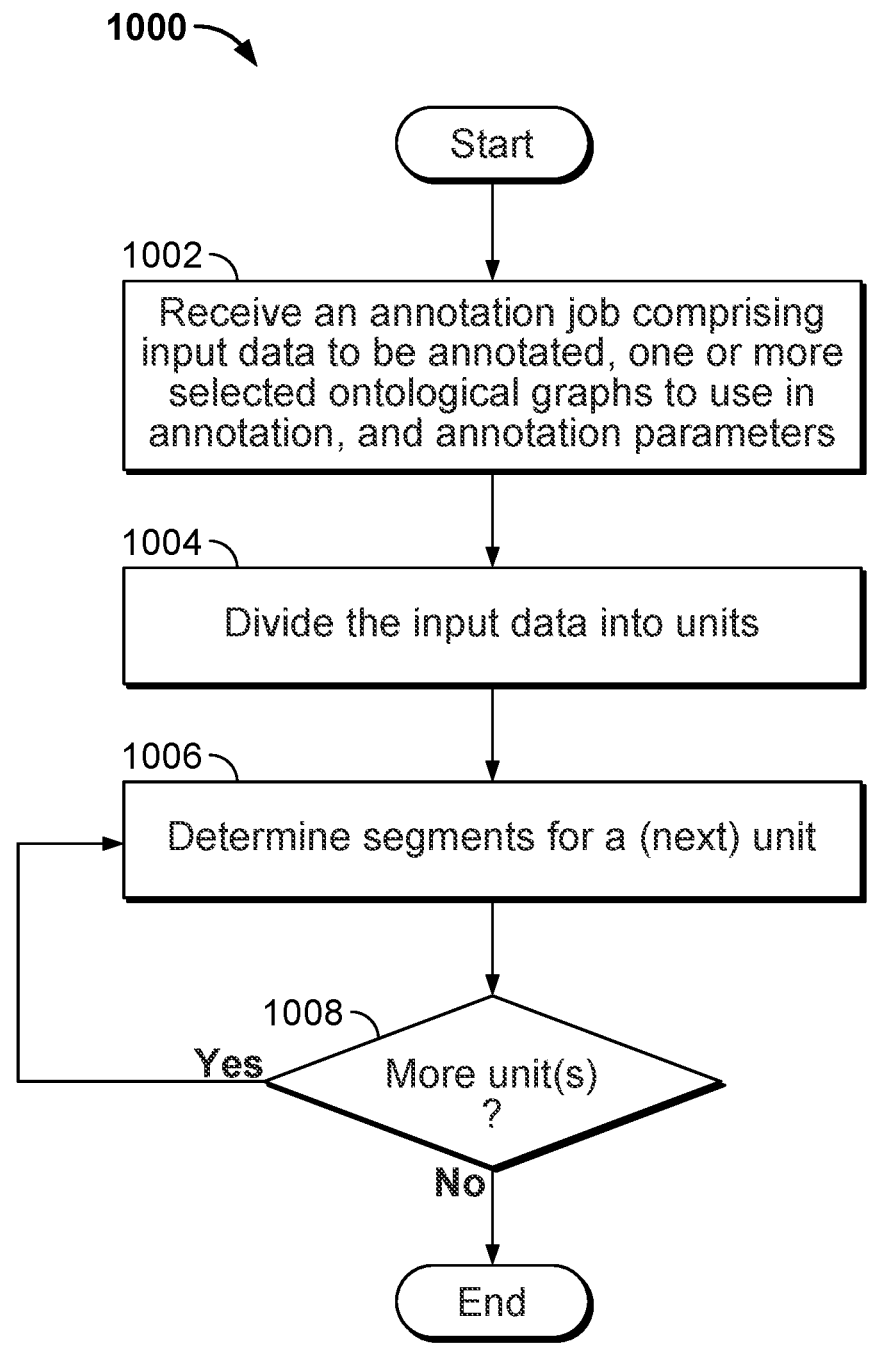
FIG. 10 is a flow diagram showing an example of a process for segmenting input data associated with an annotation job.

FIG. 10 is a flow diagram showing an example of a process for segmenting input data associated with an annotation job. In some embodiments, process 1000 is implemented at an ontology generation and annotation platform server (e.g., ontology generation and annotation platform server 116 of FIG. 1).

Process 1000 describes an example process of dividing a set of input data that is provided with an annotation job into units and then segmenting each unit into segments, prior to distributing the units of input data to annotator devices for annotator users to annotate the units of input data at an annotator user interface.

At 1002, an annotation job comprising input data to be annotated, one or more selected ontological graphs to use in annotation, and annotations parameters are received. The annotation job is received from an annotation job management device. The input data that is to be annotated can include text, images, videos, or audio. The selected ontological graphs are graphs from which nodes and/or edges can be inherited in the graphs that are to be generated as annotations to the input data. Other annotation parameters may describe criteria (e.g., geographical location, experience level, language skills) associated with annotator users that are eligible to perform annotation on the input data.

At 1004, the input data is divided into units. The input data is divided into discrete units of data so that the units can be easily distributed to multiple annotator devices of annotators users that match the annotator user criteria of the annotation job. For example, if the input data included text, then the text can be programmatically or manually divided into sentences. In another example, if the input data included images, then the images can be programmatically or manually divided into individual images.

At 1006, segments are determined for a (next) unit. Each unit of input data is further segmented into logical segments. For example, each segment includes a text-based token or a text-based label. For example, if the unit of input data included text, then the text can be programmatically or manually segmented into discrete tokens (e.g., words and/or phrases). In another example, if the input data included images, then an image can be programmatically or manually segmented/labeled with bounding boxes around portions of interest within that image (e.g., using machine learning or pre-annotation). As will be described in further detail below, the text-based tokens or labels associated with segments of each unit of input data can be matched against the names of nodes/edges within the selected ontological graphs of the annotation job and/or presented at the annotator user interface to enable the annotator users to use such text-based tokens or labels to define the names of nodes and edges that have been defined for the annotation graphs.

At 1008, whether there is at least one more unit of the input data to be segmented is determined. In the event that there is at least one more unit of the input data to be segmented, control is returned to 1006. Otherwise, in the event that there are no more units of the input data to be segmented, process 1000 ends.

Figure 11:
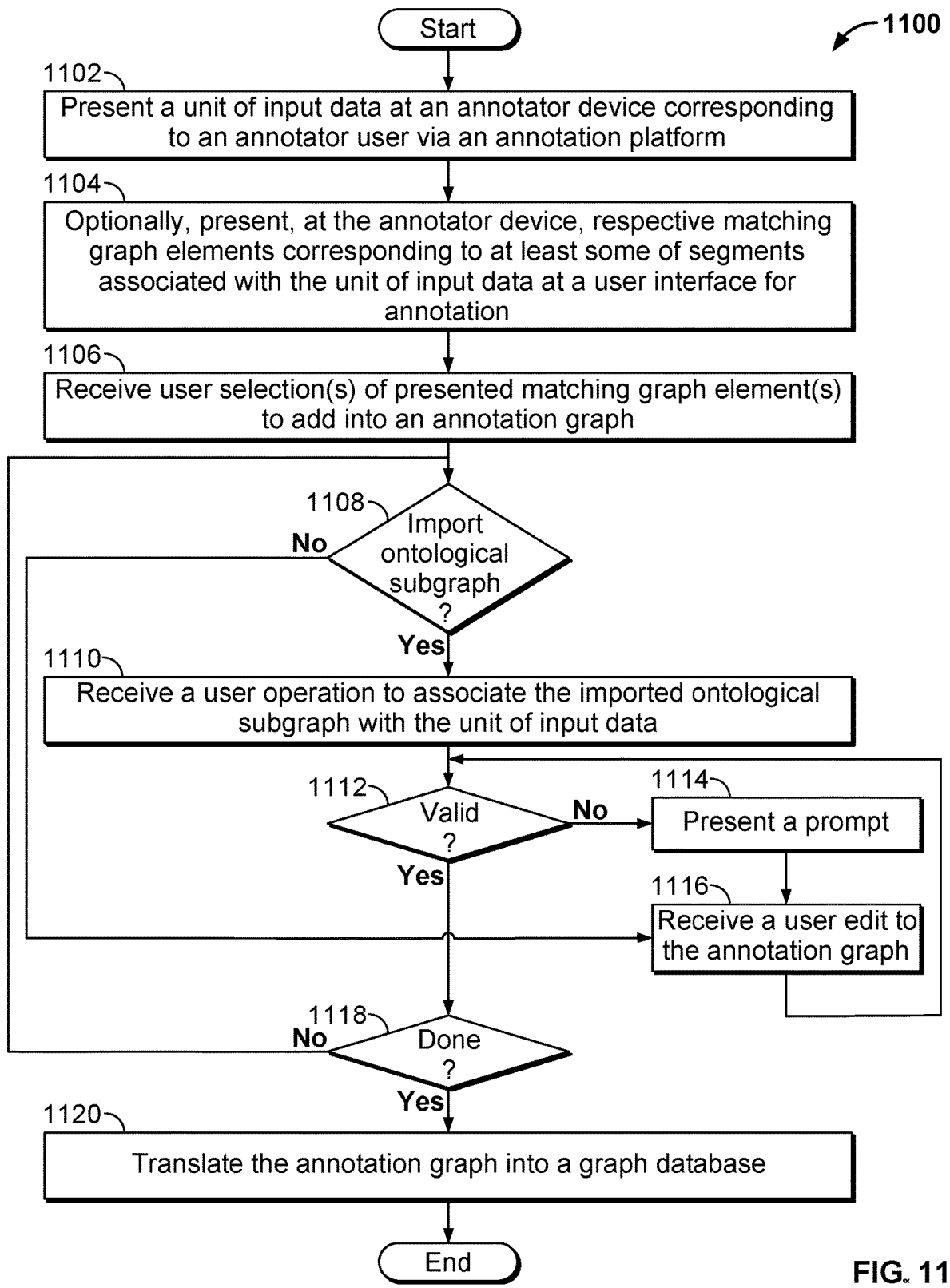
FIG. 11 is a flow diagram showing an example of a process for generating an ontological subgraph-based annotation for input data.

FIG. 11 is a flow diagram showing an example of a process for generating an ontological subgraph-based annotation for input data. In some embodiments, process 1100 is implemented at an ontology generation and annotation platform server (e.g., ontology generation and annotation platform server 116 of FIG. 1). In some embodiments, process 900 of FIG. 9 may be implemented, at least in part, by process 1100.

At 1102, a unit of input data is presented at an annotator device corresponding to an annotator user via an annotation platform. The unit of input data (e.g., including text and/or image(s)) associated with an annotation job is distributed by the ontology generation and annotation platform server to an annotator device associated with an annotator user that matches the annotator user criteria associated with the annotation job. The unit of input data is presented in an annotator user interface with a visual input area through which an ontological graph-based annotation to the unit of input data is to be defined.

At 1104, optionally, respective matching graph elements corresponding to at least some segments associated with the unit of input data at a user interface for annotation are presented at the annotator device. As mentioned above, each unit of the input data has been segmented into segments and each segment either comprises text or is otherwise labeled (e.g., using machine learning) with a text-based label. Optionally, in some embodiments, the text associated with each segment of the unit of input data is searched against the names of the elements (nodes and edges) of the selected ontological graphs associated with the annotation job. For example, a list of matching nodes and/or edges of the selected ontological graphs associated with the annotation job that correspond to a segment of the unit of input data can be presented in a dropdown menu in association with that segment at the annotator user interface. In some embodiments of process 110, step 1104 is skipped when there are no matching graph elements to segments in the input data to present or when it is not desirable to programmatically match graph elements to segments in the input data.

At 1106, user selection(s) of presented matching graph element(s) to add into an annotation graph are received. In the event that the annotator user selects a matching graph element (a matching node or a matching edge) that is associated with a segment of the unit of input data, then that selected matching node or edge is to be populated into the visual input area of the annotator user interface. In some embodiments, the populated selected matching node or edge is already renamed with the text/label of the corresponding segment of the unit of input data.

At 1108, whether an ontological subgraph is to be imported is determined. In the event that an ontological subgraph is to be imported, control is transferred to 1110. Otherwise, in the event that an ontological subgraph is not to be imported, control is transferred to 1116. To initiate the importing of an ontological subgraph (which is sometimes referred to as a "schema" herein) into the annotation graph that is currently being edited/created in the annotation user interface, an interactive element (e.g., a button) associated with importing subgraphs that is presented at the annotator user interface is selected by the annotator user. In response to the selection of that interactive element, in some embodiments, a set of candidate subgraphs for importing is presented in a window. The subgraph that is selected by the user is then presented within the visual input area of the annotator user interface. Similar to what is described above for how an imported subgraph is presented within the visual input area of an ontology editor user interface or the search query input user interface, in the context of the annotator user interface, a portion of the selected ontological subgraph to import can also be selected by the annotator user to be inherited. The inherited portion of the imported ontological subgraph is then presented in the visual input area as individual nodes and/or edges while the unselected portion of the imported ontological subgraph is presented as a determined representation (e.g., icon or other image).

At 1110, a user operation to associate the imported ontological subgraph with the unit of input data is received. For example, the annotator user can associate an inherited element of the imported subgraph with a segment of the unit of input data by renaming the element with the text/label of that segment. To link/associate inherited elements of the imported ontological subgraph with the annotation graph, in some embodiments, the annotator user can merge an inherited node from the imported ontological subgraph with a node that was added to the visual input area associated with editing the annotation graph or generate a new edge between an inherited node and a node that was added to the visual input area associated with editing the ontological graph.

At 1112, whether the annotation graph is valid is determined. In the event that the annotation graph is valid, control is transferred to 1118. Otherwise, in the event that the annotation graph is invalid, control is transferred to 1114. The validity of the placement of the nodes and edges of the annotation graph, including the integration of zero or more imported ontological subgraphs, that are presented in the visual input area is checked against logic validation rules, semantic validation rules, standards-based validation rules, annotation validation rules, and/or other configured rules.

At 1114, a prompt to indicate invalidation is presented. If any portion of the annotation graph is not valid, then a prompt describing the invalidity (e.g., the violated validation rule) can be presented to inform the annotator user to edit the placement/naming of the relevant node/edge to remove the invalidation.

At 1116, a user edit to the annotation graph is received. For example, the user edit can add a new node or edge, rename an existing node or edge, and/or associate a segment of the unit of input data with a node or edge. After the user edit is received, step 1112 is returned to in order to check whether the user edit has resulted in a valid graph or has otherwise created an invalidation.

At 1118, whether editing on the annotation graph is done is determined. In the event that editing on the annotation graph is done, control is transferred to 1120. Otherwise, in the event that editing on the annotation graph is not done, control is returned to 1108. For example, whether editing on the annotation graph is done is determined based on whether the user had selected an interactive element associated with submitting the completed annotation graph associated with the given unit of input data. Otherwise, if editing on the annotation graph is not completed, control is returned to 1108 to determine whether another subgraph is to be imported into the visual input area of the user interface.

At 1120, the annotation graph is translated into a graph database. The relationships of the nodes and edges of the annotation graph, including the incorporated at least one imported ontological subgraph, that is created in the visual input area of the annotator user interface are translated into a graph database file and also saved as an annotation result corresponding to the given input of input data. As described above for the ontology editing user interface, in some embodiments the translation process described in 1120 is implemented not as a standalone process but in real-time as part of processes 1102, 1104, 1106, 1108, 1110, and/or 1116.

Figure 12:
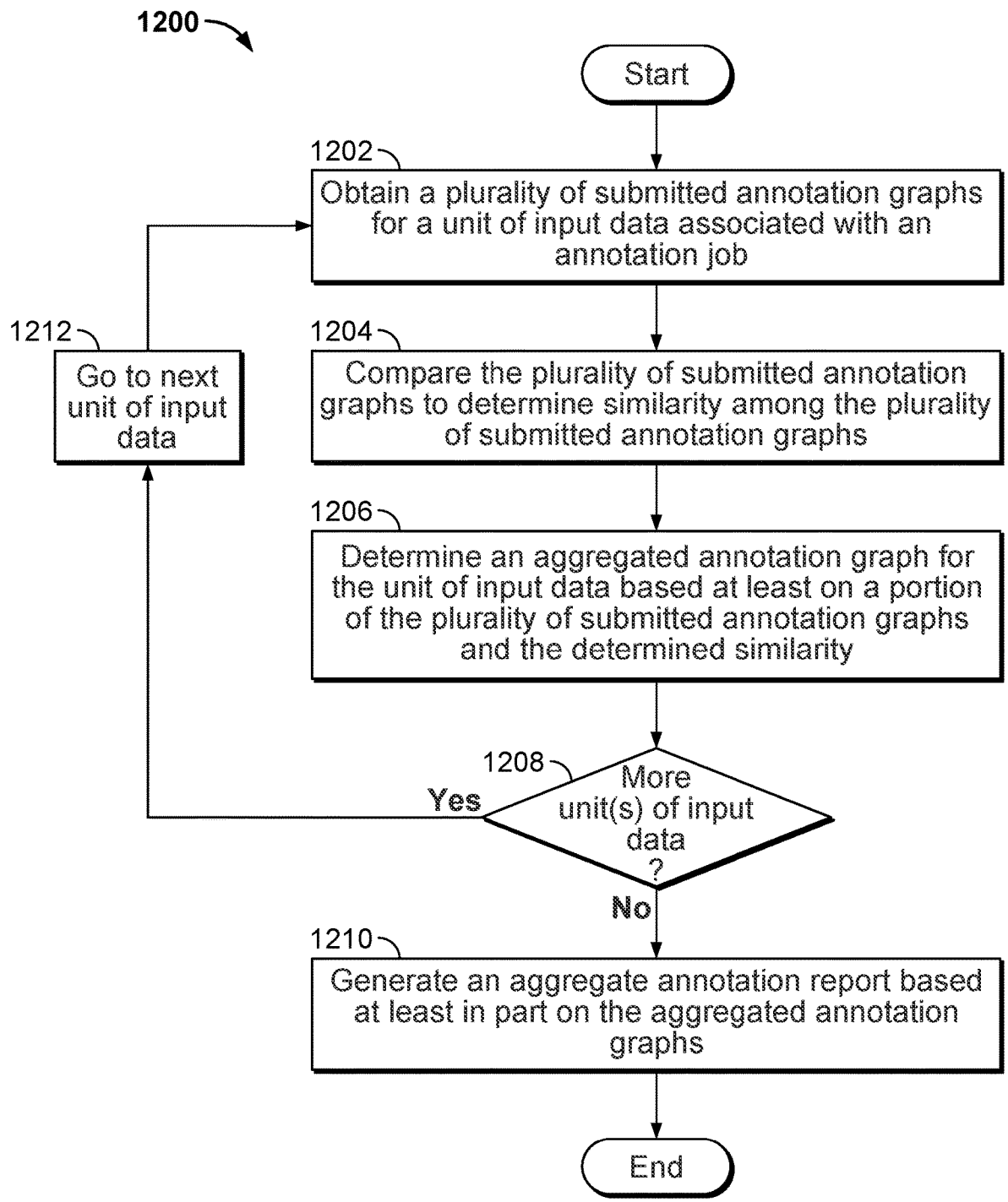
FIG. 12 is a flow diagram showing an example of a process for aggregating the obtained annotation graphs corresponding to input data of an annotation job into an aggregate annotation report.

FIG. 12 is a flow diagram showing an example of a process for aggregating the obtained annotation graphs corresponding to input data of an annotation job into an aggregate annotation report. In some embodiments, process 1200 is implemented at an ontology generation and annotation platform server (e.g., ontology generation and annotation platform server 116 of FIG. 1).

Process 1200 describes an example process by which to collect potentially multiple annotation graphs obtained from annotator devices for units of input data associated with an annotation and to process the collected annotation graphs to generate an aggregated annotation result corresponding to each unit of input data as well as statistics about that individual aggregated annotation and all annotations (aggregated and submitted) and annotators for a given annotation job. By leveraging the annotation graphs collected from a large number of annotator devices, the resulting aggregate annotation report corresponding to the input data of an annotation job can be efficiently generated and accurate with a high confidence.

At 1202, a plurality of submitted annotation graphs for a (next) unit of input data associated with an annotation job is obtained. As described above, the same unit of input data associated with an annotation job can be distributed to more than one annotator device and therefore, more than one submitted annotation graph (annotation results) can be collected from different annotator devices for the same unit of input data.

At 1204, the plurality of submitted annotation graphs is compared to determine similarity among the plurality of submitted annotation graphs. To determine the likely most accurate annotation graph (the "aggregated annotation graph" or "aggregated annotation result") for the unit of input data, the submitted annotation graphs associated with the same unit of input data are compared to each other and one or more similarities can be determined based on the comparisons. In one example, pairwise comparisons can be made between each pair of submitted annotation graphs associated with the same unit of input data. Information about these comparisons is stored in preparation for the calculation of statistics in 1206.

At 1206, an aggregated annotation graph for the unit of input data is determined based at least in part on a portion of the plurality of submitted annotation graphs and the determined similarity. In some embodiments, the submitted annotation graph that appears the most frequently (e.g., the submitted annotation graph that matches the most other submitted annotation graphs and therefore is associated with the highest confidence for being accurate) for the unit of input data is selected as the aggregated annotation graph for that unit of input data. The other annotation results that had been submitted for the unit that do not match the most frequently appearing annotation result for that unit are discarded or at least excluded from the aggregate annotation report. Also at 1206, in some embodiments, statistics for the annotation job of which the unit of input data is a part are updated based on the information stored about determined similarity between at least a portion of the plurality of submitted annotation graphs. As an example, statistics about the percent of nodes included in all/more-than-1/just-1 member(s) of the plurality of submitted annotation graphs for each unit of the input data might be updated to include the results from this particular unit of the input data. The purpose of these statistical metrics is both information collection about the job/ontology and also quality control.

At 1208, whether there is at least one more unit of input data for which to determine a corresponding aggregated annotation graph is determined. In the event that there is at least one more unit of input data for which to determine a corresponding aggregated annotation graph, control is returned to 1202. Otherwise, in the event that there are no more units of input data for which to determine a corresponding aggregated annotation graph, control is transferred to 1210.

Figure 13A:
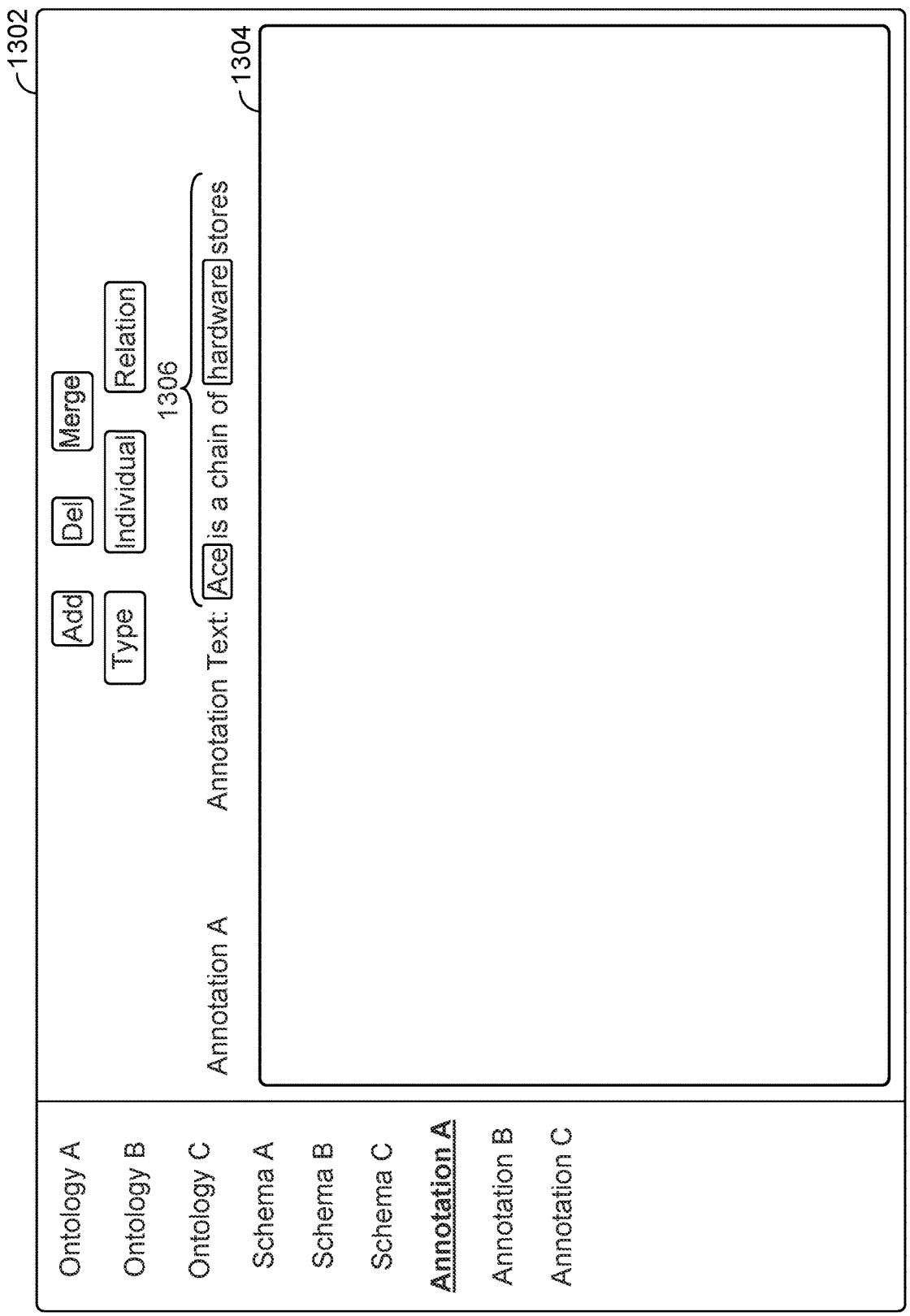
FIGS. 13A-13C show an example of creating an annotation ontological graph within the visual input area of an annotator user interface.
Figure 13B:
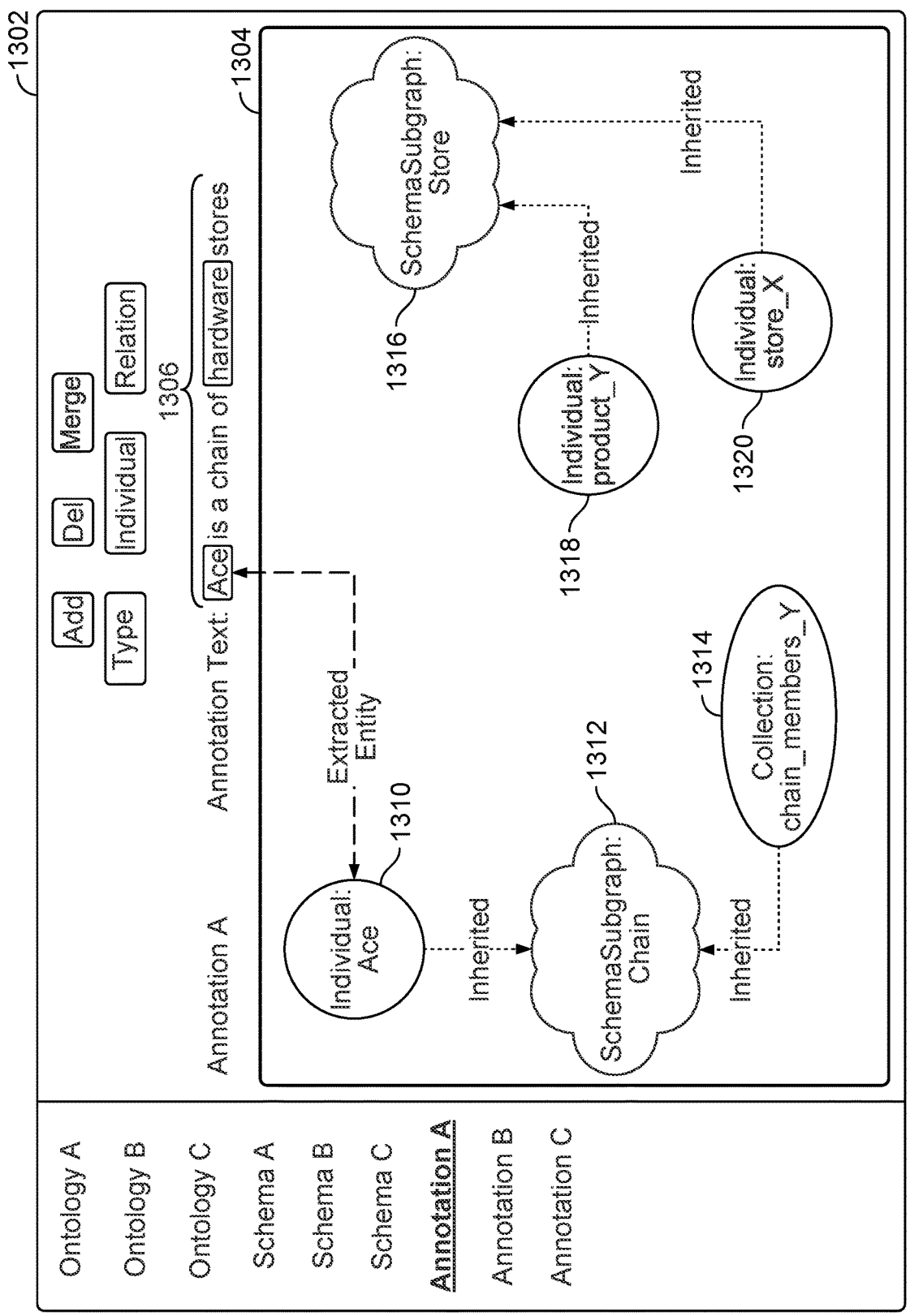
Figure 13C:
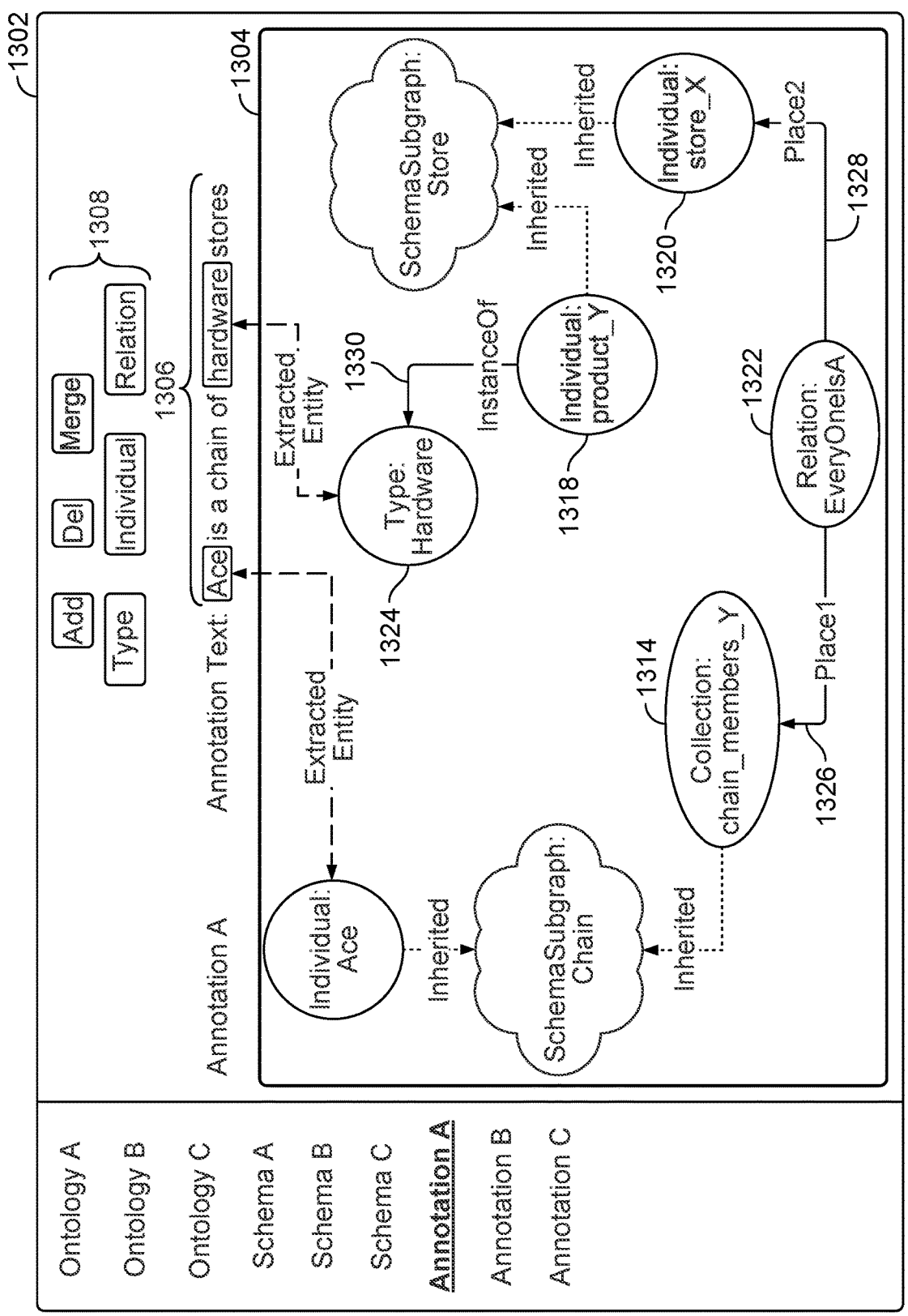

At 1210, an aggregate annotation report is generated based at least in part on the aggregated annotation graphs. The aggregate annotation report is generated to include the corresponding aggregated annotation graph that has been determined for each unit of input data associated with the annotation job. The aggregate annotation report can be sent to the annotation job management device and then used as training data to train a machine learning model to programmatically annotate input data using graphs and/or as feedback for improving annotation quality in other annotation jobs FIGS. 13A-13C show an example of creating an annotation ontological graph within the visual input area of an annotator user interface. As will be described below, the annotation graph that is created across FIGS. 13A-13C describes the relationship between segments within the presented unit of input data using, at least in part, nodes and/or edges from a selected ontology associated with the annotation job. In some embodiments, process 1100 of FIG. 11 can be used to create the annotation graph as described across FIGS. 13A-13C.

FIG. 13A shows annotator user interface 1302 that is presenting unit of input data 1306 above visual input area 1304. In the example of FIGS. 13A-13C, unit of input data 1306 comprises the sentence: "Ace is a chain of hardware stores." The sentence had previously been segmented into individual tokens, where each token comprises a different word in the sentence. While not shown in FIG. 13A, each token can be compared to the names of nodes and edges within an ontology that had been selected for the annotation job and corresponding matching nodes or edges can be determined. Visual input area 1304 is to receive the annotator user's definition of an ontological graph that is to annotate unit of input data 1306. This annotation graph is referred to as "Annotation A" in the example of FIGS. 13A-13C.

FIG. 13B shows visual input area 1304 of annotator user interface 1302 after two ontological subgraphs were selected by the annotator user to import into Annotation A. The first imported subgraph is called "Chain" and is represented by its inherited nodes "Individual: Ace" 1310 and "Collection: chain_members_Y" 1314 and its not inherited portion, which is shown as representation 1312 within visual input area 1304. The second imported subgraph is called "Store" and is represented by its inherited nodes "Individual: product_Y" 1318 and "Individual: store_X" 1320 and its not inherited portion, which is shown as representation 1316 within visual input area 1304. Because the annotator user had renamed the original name of inherited node 1310 to "Individual: Ace," which includes the token "Ace" from unit of input data 1306, node 1310 has an "Extracted Entity" relationship with token "Ace." In some embodiments, the "Extracted Entity" relationship is not shown in visual input area 1304. Even if "Extracted Entity" relationship is not a component shown in visual input area 1304, it can still be recorded in the graph database. Assuming that the segments and the unit of input data have representations in the graph database, then an "Extracted Entity" relationship is represented in the database and thus in the underlying annotation graph. In contrast, if the representation of the units of input data and their segments are in a different form (i.e., not part of the underlying graph), then the association between a graph element (e.g., "Individual: Ace" node 1310) and a segment in text 1306 will be made outside the graph in another data format.

FIG. 13C shows the completed annotation in visual input area 1304 for unit of input data 1306. Relative to the state of the annotation graph that is shown in FIG. 13B, the annotator user had used interactive elements 1308 to add node "Relation: EveryOneisA" 1322 and then connected that to nodes "Collection: chain_members_Y" 1314 and "Individual: store_X" 1320 via respective edges 1326 and 1328. While not shown in FIG. 13C, the corresponding matching nodes or edges from the selected ontology for the token of "hardware" had been presented to the annotator user and the annotator user had selected a corresponding matching node. As a result of that selection, node "Type: Hardware" 1324 had been populated into visual input area 1304. Because the annotator user had populated node 1324 into visual input area 1304 based on its match to token "hardware" of unit of input data 1306, node 1324 has an "Extracted Entity" relationship with token "hardware." The annotator user then used interactive elements 1308 to add edge 1330 between node "Type: Hardware" 1324 and node "Individual: product_Y" 1318 to show that node "Individual: product_Y" 1318 is an instance of node "Type: Hardware" 1324. The resulting annotation graph, Annotation A, to unit of input data 1306 describes the complex, graphical relationships between segments of unit of input data 1306 to each other as well as the relationships between segments of unit of input data 1306 relative to the selected ontology associated with the annotation job. As shown in the example described across FIGS. 13A-C, an annotation graph, such as Annotation A, can provide far richer and nuanced labeling than conventional parts of speech annotation for textual input data.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
receive a selection of an imported ontological subgraph to import into an annotation of input data;
present at least a portion of the imported ontological subgraph in a user interface associated with editing the annotation of the input data;
receive, via the user interface, a first user input to associate a first selected portion associated with the input data with a previously defined node associated with the presented at least portion of the imported ontological subgraph;
update the annotation of the input data based at least in part on the first user input and the imported ontological subgraph; and
receive a second user input to associate a second selected portion associated with the input data to a portion of the annotation; and
a memory coupled to the processor and configured to provide the processor with instructions.

2. The system of claim 1, wherein the processor is further configured to:
receive an annotation job comprising the input data to be annotated, one or more selected ontological graphs to use in annotation, and annotation parameters;
divide the input data into units; and
determine the units of the input data into respective segments.

3. The system of claim 2, wherein the processor is further configured to:
compare segments of the input data to elements associated with the one or more selected ontological graphs; and
present matching elements corresponding to a segment of the input data at the user interface.

4. The system of claim 3, wherein the processor is further configured to:
receive a selection of a selected matching element corresponding to the segment of the input data; and
in response to the selection, present a corresponding node or edge corresponding to the selected matching element in a visual input area of the user interface.

5. The system of claim 1, wherein the processor is further configured to:
receive a user selection of a first portion of the imported ontological subgraph, wherein the first portion of the imported ontological subgraph comprises the presented at least portion of the imported ontological subgraph;
determine a representation associated with the imported ontological subgraph to be displayed instead of a second portion of the imported ontological subgraph, wherein the second portion of the imported ontological subgraph is to be hidden at the user interface; and
present the representation associated with the imported ontological subgraph in the user interface.

6. The system of claim 5, wherein the representation associated with the imported ontological subgraph is determined based at least in part on heuristics or historical user activity.

7. The system of claim 1, wherein the first user input to associate the first selected portion associated with the input data with the previously defined node associated with the presented at least portion of the imported ontological subgraph comprises to define a name for the previously defined node associated with the presented at least portion of the imported ontological subgraph based at least in part on a text associated with the first selected portion associated with the input data.

8. The system of claim 1, wherein the processor is further configured to determine whether the annotation is valid.

9. The system of claim 1, wherein the input data comprises a unit of input data, and wherein the processor is further configured to:
obtain a plurality of submitted annotations corresponding to the unit of input data;
compare a plurality of submitted annotation graphs to determine similarity among the plurality of submitted annotation graphs;
determine an aggregated annotation graph for the unit of input data based at least in part on a portion of the plurality of submitted annotation graphs and the determined similarity; and
include the aggregated annotation graph into an aggregate annotation report corresponding to an annotation job with which the unit of input data was provided.

10. The system of claim 1, wherein the processor is further configured to store the annotation including the imported ontological subgraph in a same graph database.

11. The system of claim 1, wherein the processor is further configured to:
store the annotation separately from the imported ontological subgraph in a graph database; and
store a reference to the imported ontological subgraph in a representation of the annotation in the graph database.

12. The system of claim 11, wherein the imported ontological subgraph comprises a first ontological subgraph and wherein the graph database is configured to store a second ontological subgraph separately from the first ontological subgraph and the annotation in the graph database.

13. A method, comprising:
receiving a selection of an imported ontological subgraph to import into an annotation of input data;
presenting at least a portion of the imported ontological subgraph in a user interface associated with editing the annotation of the input data;
receiving, via the user interface, a first user input to associate a first selected portion associated with the input data with a previously defined node associated with the presented at least portion of the imported ontological subgraph;
updating the annotation of the input data based at least in part on the first user input and the imported ontological subgraph; and
receiving a second user input to associate a second selected portion associated with the input data to a portion of the annotation.

14. The method of claim 13, further comprising:
receiving an annotation job comprising the input data to be annotated, one or more selected ontological graphs to use in annotation, and annotation parameters;
dividing the input data into units; and
determining the units of the input data into respective segments.

15. The method of claim 13, further comprising:
receiving a user selection of a first portion of the imported ontological subgraph, wherein the first portion of the imported ontological subgraph comprises the presented at least portion of the imported ontological subgraph;
determining a representation associated with the imported ontological subgraph to be displayed instead of a second portion of the imported ontological subgraph, wherein the second portion of the imported ontological subgraph is to be hidden at the user interface; and
presenting the representation associated with the imported ontological subgraph in the user interface.

16. The method of claim 13, wherein the first user input to associate the first selected portion associated with the input data with the previously defined node associated with the presented at least portion of the imported ontological subgraph comprises to define a name for the previously defined node associated with the presented at least portion of the imported ontological subgraph based at least in part on a text associated with the first selected portion associated with the input data.

17. The method of claim 13, wherein the input data comprises a unit of input data, and wherein the method further comprising:
obtaining a plurality of submitted annotations corresponding to the unit of input data;
comparing a plurality of submitted annotation graphs to determine similarity among the plurality of submitted annotation graphs;
determining an aggregated annotation graph for the unit of input data based at least in part on a portion of the plurality of submitted annotation graphs and the determined similarity; and
including the aggregated annotation graph into an aggregate annotation report corresponding to an annotation job with which the unit of input data was provided.

18. A system, comprising:
a processor configured to:
receive a selection of an imported ontological subgraph to import into an annotation of input data;
present at least a portion of the imported ontological subgraph in a user interface associated with editing the annotation of the input data, comprising to:
receive a user selection of a first portion of the imported ontological subgraph, wherein the first portion of the imported ontological subgraph comprises the presented at least portion of the imported ontological subgraph;
determine a representation associated with the imported ontological subgraph to be displayed instead of a second portion of the imported ontological subgraph, wherein the second portion of the imported ontological subgraph is to be hidden at the user interface; and
present the representation associated with the imported ontological subgraph in the user interface;
receive, via the user interface, a user input to associate a selected portion associated with the input data with a previously defined node associated with the presented at least portion of the imported ontological subgraph; and
update the annotation of the input data based at least in part on the user input and the imported ontological subgraph; and a memory coupled to the processor and configured to provide the processor with instructions.

19. A system, comprising:

a processor configured to:

receive a selection of an imported ontological subgraph to import into an annotation of input data;

present at least a portion of the imported ontological subgraph in a user interface associated with editing the annotation of the input data;

receive, via the user interface, a user input to associate a selected portion associated with the input data with a previously defined node associated with the presented at least portion of the imported ontological subgraph, wherein the user input to associate the selected portion associated with the input data with the previously defined node associated with the presented at least portion of the imported ontological subgraph comprises to define a name for the previously defined node associated with the presented at least portion of the imported ontological subgraph based at least in part on a text associated with the selected portion associated with the input data; and update the annotation of the input data based at least in part on the user input and the imported ontological subgraph; and a memory coupled to the processor and configured to provide the processor with instructions.

20. A system, comprising:

a processor configured to:

receive a selection of an imported ontological subgraph to import into an annotation of input data;

present at least a portion of the imported ontological subgraph in a user interface associated with editing the annotation of the input data;

receive, via the user interface, a user input to associate a selected portion associated with the input data with a previously defined node associated with the presented at least portion of the imported ontological subgraph, wherein the input data comprises a unit of input data;

update the annotation of the input data based at least in part on the user input and the imported ontological subgraph;

obtain a plurality of submitted annotations corresponding to the unit of input data;

compare a plurality of submitted annotation graphs to determine similarity among the plurality of submitted annotation graphs;

determine an aggregated annotation graph for the unit of input data based at least in part on a portion of the plurality of submitted annotation graphs and the determined similarity; and include the aggregated annotation graph into an aggregate annotation report corresponding to an annotation job with which the unit of input data was provided; and a memory coupled to the processor and configured to provide the processor with instructions.

* * * * *